(12) United States Patent
Choi et al.

(10) Patent No.: US 12,422,959 B2
(45) Date of Patent: Sep. 23, 2025

(54) INPUT SENSING DEVICE, DISPLAY DEVICE INCLUDING THE SAME, AND ELECTRONIC DEVICE INCLUDING THE DISPLAY DEVICE

(71) Applicant: SAMSUNG DISPLAY CO., LTD., Yongin-si (KR)

(72) Inventors: Jae Uk Choi, Yongin-si (KR); Ki Seo Kim, Yongin-si (KR); Yun Ho Kim, Yongin-si (KR); Hyun Jae Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/609,897

(22) Filed: Mar. 19, 2024

(65) Prior Publication Data
US 2024/0393908 A1    Nov. 28, 2024

(30) Foreign Application Priority Data
May 24, 2023    (KR) .......................... 10-2023-0067123

(51) Int. Cl.
*G06F 3/044*        (2006.01)
*G06F 3/01*         (2006.01)
(Continued)

(52) U.S. Cl.
CPC ............ *G06F 3/0443* (2019.05); *G06F 3/017* (2013.01); *G06F 3/04164* (2019.05);
(Continued)

(58) Field of Classification Search
CPC .... G06F 3/0443; G06F 3/017; G06F 3/04164; G06F 3/0446; G06F 3/0448;
(Continued)

(56) References Cited

U.S. PATENT DOCUMENTS 9,141,210 B2    9/2015  Shin et al.
9,383,867 B2    7/2016  Hirakawa et al.
(Continued)

FOREIGN PATENT DOCUMENTS

KR          10-1474061 B1       12/2014
KR       10-2020-0143628 A      12/2020
(Continued)

*Primary Examiner* — Stephen G Sherman
(74) *Attorney, Agent, or Firm* — F. CHAU & ASSOCIATES, LLC

(57) ABSTRACT

A display device and an electronic device include an input sensing device. Touch sensor electrodes of the input sensing device are disposed in a first sensing area of the base layer. Gesture sensor electrodes are disposed in a second sensing area of the base layer that surrounds the first sensing area, and are electrically insulated from the touch sensor electrodes. First pads and second pads are disposed in a non-sensing area of the base layer that is located at one side of the second sensing area. Touch sensing lines connect the touch sensor electrodes and the first pads to each other. Gesture sensing lines connect the gesture sensor electrodes and the second pads to each other. One of the gesture sensor electrodes includes sub-electrodes separated from each other by the touch sensing lines and a bridge that connects adjacent sub-electrodes to each other.

18 Claims, 13 Drawing Sheets

(51) Int. Cl.
*G06F 3/041* (2006.01)
*H01Q 1/22* (2006.01)
(52) U.S. Cl.
CPC .......... *G06F 3/0446* (2019.05); *G06F 3/0448* (2019.05); *G06F 2203/04107* (2013.01); *G06F 2203/04112* (2013.01); *H01Q 1/22* (2013.01)
(58) Field of Classification Search
CPC .. G06F 3/0412; G06F 3/0445; G06F 3/04162; G06F 3/044; G06F 3/047; G06F 2203/04107; G06F 2203/04112; G06F 2203/04111; H01Q 1/22; H01Q 1/44; H01Q 1/243; H01Q 21/28
See application file for complete search history.

(56) References Cited

U.S. PATENT DOCUMENTS

| | | | |
|---|---|---|---|
| 9,921,739 B2 | 3/2018 | Dorfner | |
| 11,275,473 B2 | 3/2022 | Bok et al. | |
| 11,385,749 B2 | 7/2022 | Youk et al. | |
| 2010/0253646 A1* | 10/2010 | Hiratsuka | G06F 3/0446 345/174 |
| 2013/0293489 A1* | 11/2013 | Shin | G06F 3/04166 345/173 |
| 2020/0393936 A1* | 12/2020 | Bok | G06F 3/0414 |

FOREIGN PATENT DOCUMENTS

| KR | 10-2021-0086142 A | 7/2021 |
|---|---|---|
| KR | 10-2518832 B1 | 4/2023 |

\* cited by examiner

INPUT SENSING DEVICE, DISPLAY DEVICE INCLUDING THE SAME, AND ELECTRONIC DEVICE INCLUDING THE DISPLAY DEVICE

CROSS-REFERENCE TO RELATED APPLICATION

The present application claims priority under 35 U.S.C. § 119(a) from Korean patent application No. 10-2023-0067123, filed on May 24, 2023 in the Korean Intellectual Property Office, the contents of which are herein incorporated by reference in their entirety.

TECHNICAL FIELD

Embodiments of the present disclosure are generally directed to an input sensing device, a display device that includes the same, and an electronic device that includes the display device.

DISCUSSION

A display device typically includes a display unit that displays an image and a sensor unit that senses a touch. The sensor unit can be used to determine a touch position coordinate of an object, and to check whether the object has approached and a motion of the object.

SUMMARY

Embodiments provide an input sensing device that includes a gesture sensor and an antenna in addition to a touch sensor without any substantial increase in area, and a display device and an electronic device that include the input sensing device.

In accordance with an embodiment of the present disclosure, there is provided an input sensing device that includes: touch sensor electrodes disposed in a first sensing area of a base layer; gesture sensor electrodes disposed in a second sensing area of the base layer that surrounds the first sensing area, where the gesture sensor electrodes are electrically insulated from the touch sensor electrodes; first pads and second pads disposed in a non-sensing area of the base layer that is located at one side of the second sensing area; touch sensing lines that connect the touch sensor electrodes and the first pads to each other; and gesture sensing lines that connect the gesture sensor electrodes and the second pads to each other. One of the gesture sensor electrodes includes: sub-electrodes separated from each other by the touch sensing lines; and a bridge that connects adjacent sub-electrodes to each other.

The touch sensor electrodes and the sub-electrodes are disposed in the same layer. The bridge is disposed in a different layer from the touch sensor electrodes.

The touch sensor electrodes have a mesh structure. In a plan view, each of the touch sensor electrodes connected to the touch sensing lines includes a protrusion part that protrudes between the sub-electrodes. In a plan view, the bridge crosses the protrusion part.

The touch sensing lines do not have a mesh structure. The bridge does not intersect the touch sensing lines.

Another of the gesture sensor electrodes includes only one electrode, and does not include any sub-electrodes.

In a plan view, the sub-electrodes are spaced apart from the touch sensor electrodes by 100 μm or more.

The input sensing device further includes: a touch driver connected to the first pads, where the touch driver senses an object's touch input; and a gesture driver connected to the second pads, where the gesture driver senses an object's approach or motion.

The gesture sensor electrodes include four gesture sensor electrodes that extend along an edge of the first sensing area in different directions with respect to the first sensing area.

In a plan view, the touch sensing lines extend along a first side of the base layer, and the gesture sensing lines extend along a second side of the base layer that differs from the first side. The touch sensing lines and the gesture sensing lines do not intersect each other.

The input sensing device further includes an antenna. At least one gesture sensor electrode includes a concave part that has a width that is less than an average width of the gesture sensor electrodes. The antenna has a shape that corresponds to that of the concave part and is disposed in the concave part.

In a plan view, the antenna is spaced apart from the at least one gesture sensor electrode by 100 μm or more.

The average width of the gesture sensor electrodes is about 500 μm, and the width of the antenna is about 300 μm.

The input sensing device further includes: a third pad disposed in the non-sensing area of the base layer; and a communication line that connects the third pad and the antenna to each other. The antenna includes a first electrode and a second electrode that surrounds the first electrode. The communication line includes a pair of ground lines connected to the second electrode and a signal line between the pair of ground lines and that is connected to the first electrode.

In a plan view, the bridge crosses one of the touch sensing lines.

In accordance with another embodiment of the present disclosure, there is provided a display device that includes: a display layer that includes light emitting elements; and a sensor layer disposed on the display layer. The sensor layer includes: touch sensor electrodes disposed in a first sensing area; touch sensing lines connected to the touch sensor electrodes; gesture sensor electrodes disposed in a second sensing area that surrounds the first sensing area, where the gesture sensor electrodes are electrically insulated from the touch sensor electrodes; and gesture sensing lines connected to the gesture sensor electrodes. One of the gesture sensor electrodes includes: sub-electrodes separated from each other by the touch sensing lines; and a bridge that connects adjacent sub-electrodes to each other.

The touch sensor electrodes have a mesh structure. In a plan view, each of the touch sensor electrodes connected to the touch sensing lines includes a protrusion part that protrudes between the sub-electrodes. in a plan view, the bridge crosses the protrusion part.

In a plan view, the sub-electrodes are spaced apart from the touch sensor electrodes by 100 μm or more.

In a plan view, the touch sensing lines extend along a first side of the base layer, and the gesture sensing lines extend along a second side of the base layer that differs from the first side. The touch sensing lines and the gesture sensing lines do not intersect each other.

The sensor layer further includes an antenna. At least one gesture sensor electrode includes a concave part that has a width that is less than an average width of the gesture sensor electrodes. The antenna has a shape that corresponds to that of the concave part and is disposed in the concave part.

In accordance with still another embodiment of the present disclosure, there is provided an electronic device that includes: a display panel that includes light emitting elements; a sensor disposed on the display panel; and a processor connected to the display panel and the sensor. The sensor includes: touch sensor electrodes disposed in a first sensing area; gesture sensor electrodes disposed in a second sensing area that surrounds the first sensing area, where the gesture sensor electrodes are electrically insulated from the touch sensor electrodes and at least one of the gesture sensor electrodes includes a concave part that has a width that is less than an average width of the gesture sensor electrode; and an antenna that has a shape that corresponds to that of the concave part, where the antenna is disposed in the concave part. The processor senses an object's touch input based on a sensing signal received from the touch sensor electrodes, senses an object's approach or motion based on a sensing signal received from the gesture sensor electrodes, and communicates with an external device through the antenna.

DETAILED DESCRIPTION

Figure 1:
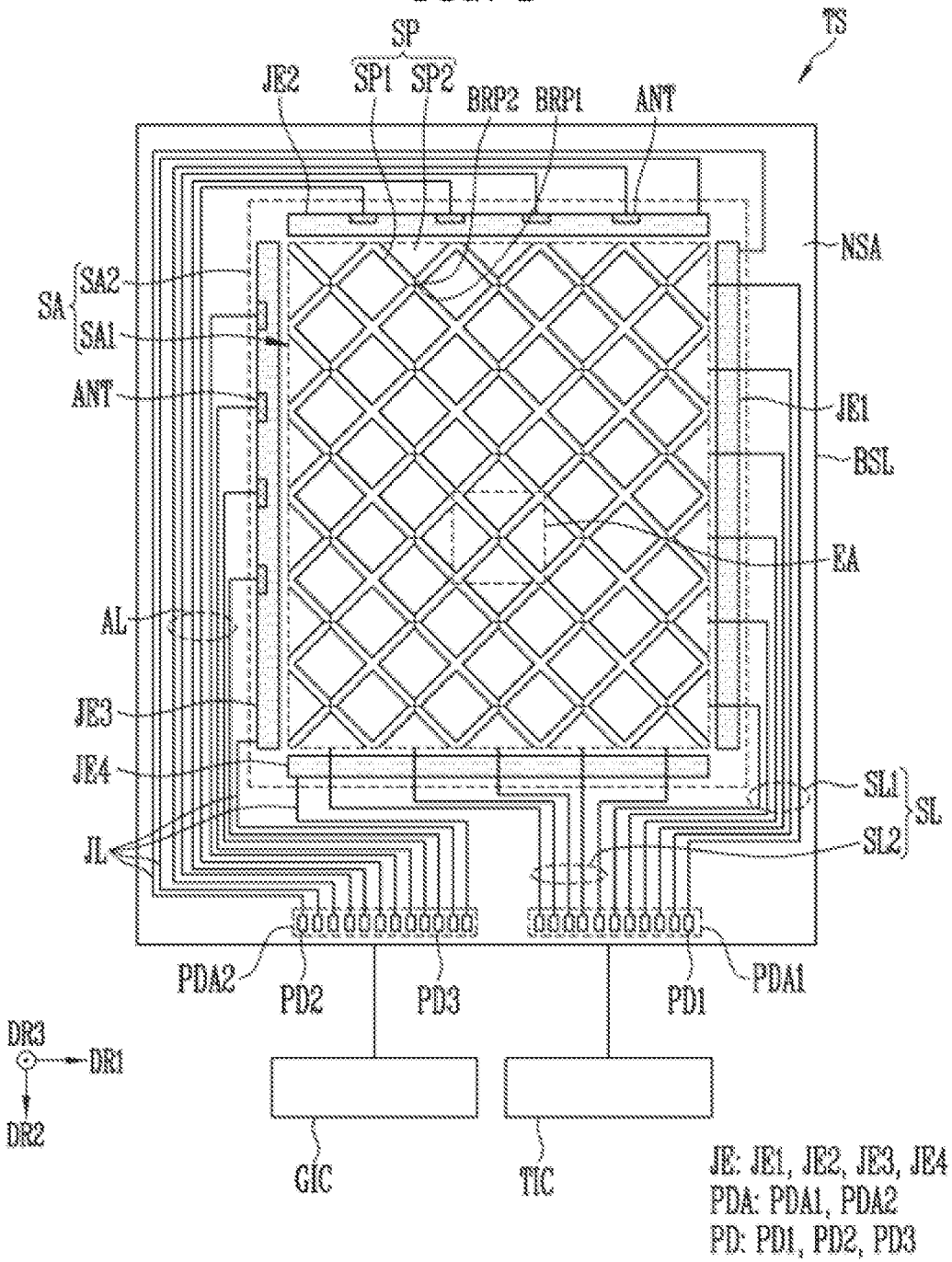
FIG. 1 is a schematic plan view of an input sensing device in accordance with embodiments of the present disclosure.

Hereinafter, exemplary embodiments are described in detail with reference to the accompanying drawings; however, they may be embodied in different forms and should not be construed as limited to the embodiments set forth herein. The present disclosure may be implemented in various different forms and is not limited to the exemplary embodiments described in the present specification.

It will be understood that when an element is referred to as being "between" two elements, it can be the only element between the two elements, or one or more intervening elements may also be present. Like reference numerals may refer to like elements throughout.

The term "about" as used herein is inclusive of the stated value and means within an acceptable range of deviation for the particular value as determined by one of ordinary skill in the art, considering the measurement in question and the error associated with measurement of the particular quantity, such as the limitations of the measurement system. For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

The present disclosure is not limited to embodiments disclosed below, and may be implemented in various forms. Each embodiment disclosed below may be independently embodied or be combined with at least another embodiment prior to being embodied.

Figure 2:
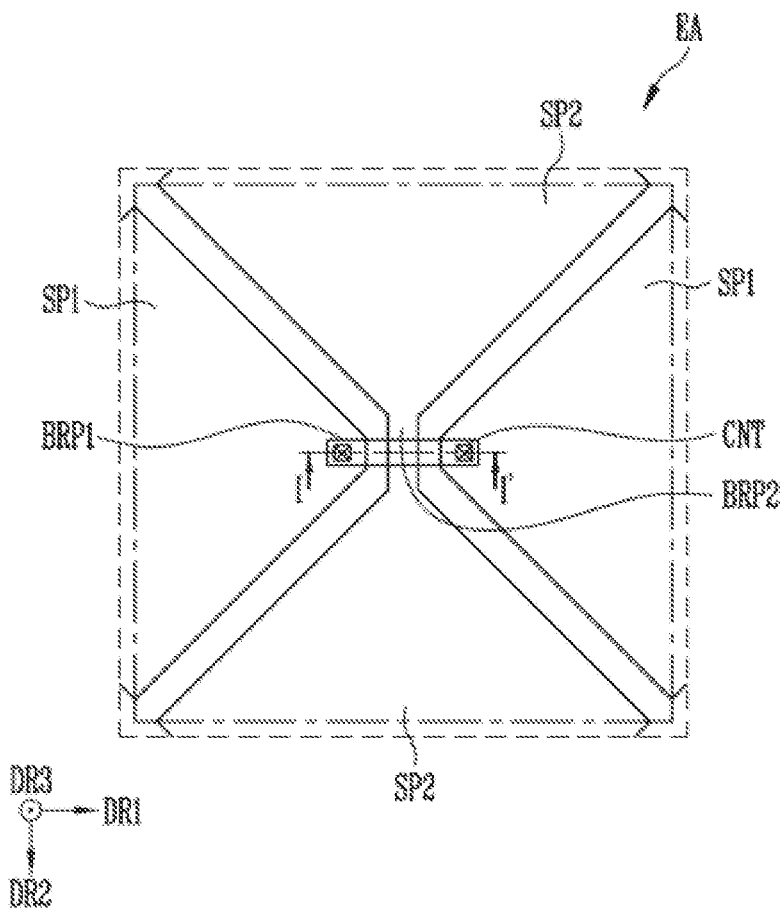
FIG. 2 is an enlarged plan view of an embodiment of portion EA shown in FIG. 1.
Figure 3:
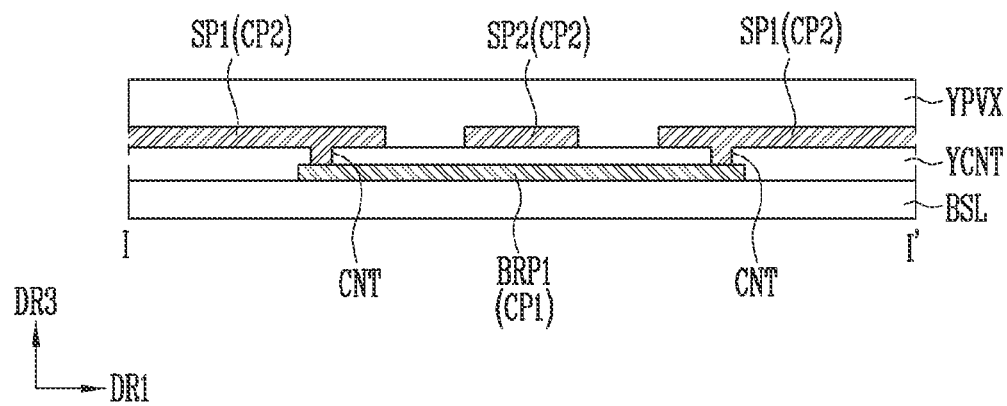
FIG. 3 is a sectional view taken along line I-I' in FIG. 2.
Figure 4:
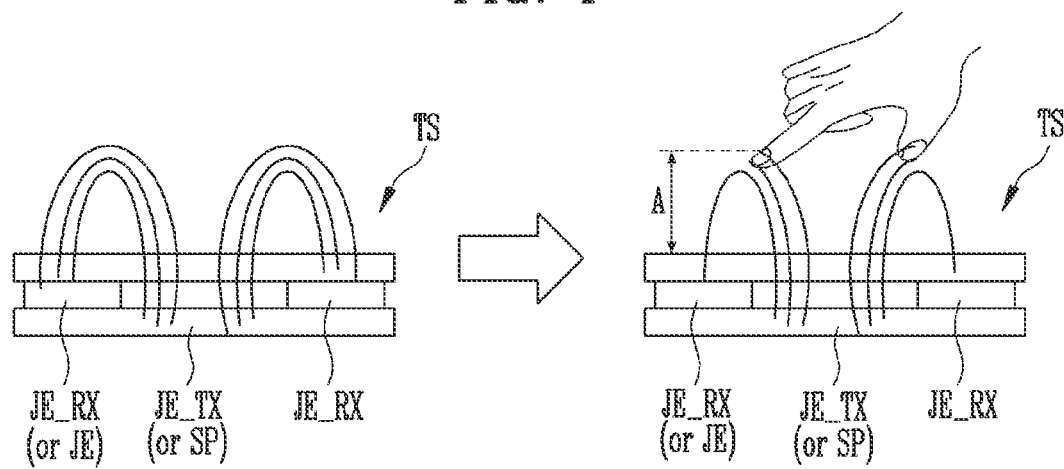
FIG. 4 illustrates an operation in which an input sensing device shown in FIG. 1 senses an approach of an object.

FIG. 1 is a schematic plan view of an input sensing device in accordance with embodiments of the present disclosure. FIG. 2 is an enlarged plan view of an embodiment of portion EA shown in FIG. 1. FIG. 3 is a sectional view taken along line I-I' in FIG. 2. FIG. 4 illustrates an operation in which the input sensing device shown in FIG. 1 senses an approach of an object.

Referring to FIGS. 1 to 4, in an embodiment, an input sensing device (or input sensor) TS senses a touch capacitance caused by a contact and/or an approach of a separate object (or input means), such as a hand of a user or a conductor similar thereto, thereby recognizing a touch input and/or a hover input to the input sensing device TS. A touch input refers to an object that is actually directly touching (or contacting) the input sensing device TS, and a hover input refers to an object that is in the vicinity of the input sensing device TS, but is not actually touching the input sensing device TS.

The input sensing device TS includes a base layer BSL. The base layer BSL is made of at least one of tempered glass, transparent plastic, or a transparent film, etc. However, the base layer BSL is not limited thereto. For example, the base layer BSL may include at least one insulating layer.

The base layer BSL includes a sensing area SA that can sense a touch input of an object and a non-sensing area NSA, such as a peripheral area or a dead space, that is located at one side of the sensing area SA or surrounds at least a portion of the sensing area SA. A sensor electrode that senses a touch or an approach, a motion, etc., of the object is disposed in the sensing area SA.

In an embodiment, the sensing area SA includes a first sensing area SA1 and a second sensing area SA2 that surrounds the first sensing area SAL. Touch sensor electrodes (or touch sensors) SP that can sense a touch of an object are disposed in the first sensing area SA, and gesture sensor electrodes (or gesture sensors) JE that sense an approach or a motion of an object are disposed in the second sensing area SA2. In addition, an antenna ANT for wireless communication is disposed in the second sensing area SA2. For example, an electronic device that includes the input sensing device TS can perform not only fourth-generation (4G) mobile communication such as Long Term Evolution (LTE) and fifth-generation (5G) mobile communication, but also near field communication, such as Radio Frequency Identification (RFID) tags, and the input sensing device TS includes an antenna ANT for mobile communication, near field communication, etc.

Touch sensing lines SL and gesture sensing lines JL that are electrically connected to the sensor electrodes to receive and transmit a sensing signal, and communication lines AL that are electrically connected to the antenna ANT to transmit a communication signal, are disposed in the non-sensing area NSA. In addition, a pad unit (or pad area) PDA that is electrically connected to the touch sensing lines SL, the gesture sensing lines JL, and the communication lines AL is disposed in the non-sensing area NSA. The pad unit PDA includes pads PD.

Hereinafter, components in the sensing area SA will be first described, and components in the non-sensing area NSA will then be described.

The input sensing device TS includes touch sensor electrodes SP and first and second bridge patterns BRP1 and BRP2.

The touch sensor electrodes SP include first touch sensor electrodes SP1 and second touch sensor electrodes SP2 that are electrically insulated from the first touch sensor electrodes SP1.

The first touch sensor electrodes SP1 are arranged in a first direction DR1, and adjacent first touch sensor electrodes SP1 are electrically connected to each other through the first bridge patterns BRP1 to constitute at least one sensor row. The second touch sensor electrodes SP2 are arranged in a second direction DR2 that crosses the first direction DR1, and adjacent second touch sensor electrodes SP2 are electrically connected to each other through the second bridge patterns BRP2 to constitute at least one sensor column. FIG. 1 shows that each of the touch sensor electrodes SP has a diamond shape. However, embodiments of the present disclosure are not necessarily limited thereto. For example, in other embodiments, the touch sensor electrodes SP can have various other shapes, such as a circular shape, a rectangular shape, a triangular shape, or a mesh structure.

Each of the first and second touch sensor electrodes SP1 and SP2 is electrically connected to one first pad PD1 through a corresponding touch sensing line SL. For example, each of the first touch sensor electrodes SP1 is electrically connected to one first pad PD1 through a corresponding first sensing line SL1, and each of the second touch sensor electrodes SP2 is electrically connected to one first pad PD1 through a corresponding second sensing line SL2.

The above-described first touch sensor electrodes SP1 are driving electrodes that receive a touch driving signal that detects a touch in the sensing area SA, and the above-described second touch sensor electrodes SP2 are sensing electrodes that output a sensing signal used for detecting a touch position in the sensing area SA. However, embodiments of the present disclosure are not necessarily limited thereto. In other embodiments, the first touch sensor electrodes SP1 are sensing electrodes, and the second touch sensor electrodes SP2 are touch driving electrodes.

The input sensing device TS can sense a variation of mutual capacitance formed between the first and second touch sensor electrodes SP1 and SP2, thereby recognizing an object's touch.

The first bridge patterns BRP1 are used to electrically connect adjacent first touch sensor electrodes SP1 in the first direction DR1, and each first bridge pattern BRP1 has a shape that extends in the first direction DR1.

The second bridge patterns BRP2 are used to electrically connect adjacent second touch sensor electrodes SP2 in the second direction DR2, and each second bridge pattern BRP2 extends in the second direction DR2. Each second bridge pattern BRP2 is integrally formed with the corresponding second touch sensor electrodes SP2. When each second bridge pattern BRP2 is integrally formed with corresponding second touch sensor electrodes SP2, the second bridge pattern BRP2 is one area of the second touch sensor electrodes SP2.

Referring to FIGS. 2 and 3, in an embodiment, the input sensing device TS includes a first conductive pattern CP1 disposed on the base layer BSL, a first sensor insulating layer YCNT disposed over the first conductive pattern CP1, a second conductive pattern CP2 disposed on the first sensor insulating layer YCNT, and a second sensor insulating layer YPVX disposed over the second conductive pattern CP2.

The first bridge patterns BRP1 disposed in the first sensing area SA1 are included in the first conductive pattern CP1, and the first and second touch sensor electrodes SP1 and SP2 and the second bridge patterns BRP2 are included in the second conductive pattern CP2. Adjacent first touch sensor electrodes SP1 in the first direction DR1 are electrically and/or physically connected to each other by a contact hole CNT that penetrates the first sensor insulating layer YCNT and the first bridge patterns BRP1.

In addition, some of the touch sensing lines SL disposed in the non-sensing area NSA are included in the first conductive pattern CP1, and other touch sensing lines SL are included in the second conductive pattern CP2. However, embodiments of the present disclosure are not necessarily limited thereto.

An above-described embodiment has been described as including the first bridge patterns BRP1 in the first conductive pattern CP1, and the first and second touch sensor electrodes SP1 and SP and the second bridge patterns BRP2 in the second conductive pattern CP2. However, embodiments of the present disclosure are not necessarily limited thereto. In some embodiments, the first and second touch sensor electrodes SP1 and SP and the second bridge patterns BRP2 are included in the first conductive pattern CP1, and the first bridge patterns BRP are included in the second conductive pattern CP2.

In addition, an embodiment has been described as including the first conductive pattern CP1 disposed on the base layer BSL and the second conductive layer CP2 disposed on the first sensor insulating layer YCNT. However, embodiments of the present disclosure are not necessarily limited thereto. In some embodiments, the first conductive pattern CP1 are disposed on the first sensor insulating layer YCNT, and the second conductive pattern CP2 are disposed on the base layer BSL.

In addition, an embodiment has been described as including the first and second touch sensor electrodes SP1 and SP2 in the same layer. However, embodiments of the present disclosure are not necessarily limited thereto. In some embodiments, the first touch sensor electrodes SP1 and the second touch sensor electrodes SP2 are provided in different layers.

Each of the first touch sensor electrodes SP1, the second touch sensor electrodes SP2, the first bridge patterns BRP1, and the second bridge pattern BRP2, and the first conductive pattern CP1 and the second conductive pattern CP2, includes at least one of a metal, a transparent conductive material, and/or various other conductive materials. For example, the conductive material includes at least one of gold (Au), silver (Ag), aluminum (Al), molybdenum (Mo), chromium (Cr), titanium (Ti), nickel (Ni), neodymium (Nd), copper (Cu), or platinum (Pt), etc, or alloys thereof. Each of the first touch sensor electrodes SP1, the second touch sensor electrodes SP2, the first bridge patterns BRP1, and the second bridge pattern BRP2, and the first conductive pattern CP1 and the second conductive pattern CP2, have a mesh structure that includes conductive fine lines. On addition, the conductive material may include at least one transparent conductive material, such as silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, or graphene, etc.

The gesture sensor electrode JE is disposed in the second sensing area SA2, and is electrically insulated from the touch sensor electrodes SP.

The gesture sensor electrodes JE extend along an edge of the first sensing area SA1, and include first, second, third, and fourth gesture sensor electrodes JE1, JE2, JE3, and JE4 that extends in different directions with respect to the first sensing area SAL. For example, when the first sensing area SA1 has a rectangular planar shape, the first gesture sensor electrode JE1 extends in the second direction DR2 along a right side of the first sensing area SA1, the second gesture sensor electrode JE2 extends in the first direction DR1 along an upper side of the first sensing area SA1, the third gesture sensor electrode JE3 extends in the second direction DR2 along a left side of the first sensing area SA1, and the fourth gesture sensor electrode JE4 extends in the first direction DR1 along a lower side of the first sensing area SAL. When the first sensing area SA1 has a planar shape such as a circular shape, a polygonal shape, or an atypical shape, the shape of each of the gesture sensor electrodes JE is changed corresponding to the planar shape of the first sensing area SAL.

The input sensing device TS senses a variation of capacitance formed between the gesture sensor electrodes JE and the first sensing area SA1, such as the touch sensor electrodes SP, thereby recognizing an object's approach or motion.

Referring to FIG. 4, in an embodiment, a driving signal is transmitted to a gesture driving electrode JE_TX, and an electric field forms between the gesture driving electrode JE_TX located at the center of the input sensing device TS and a gesture sensing electrode JE_RX located at an edge of the input sensing device TS. For example, the gesture driving electrode JE_TX corresponds to at least some of the touch sensor electrodes SP, and the gesture sensing electrode JE_RX corresponds to the gesture sensor electrodes JE. When an object, such as a user's finger, approaches within a specific distance A of the input sensing device TS, the electric field is absorbed by the object, and therefore, a capacitance between the gesture driving electrode JE_TX and the gesture sensing electrode JE_RX changes. The input sensing device TS can sense an object's motion in four directions, such as top, bottom, left, and right, and all direction combinations thereof, based on sensing signals received from the first, second, third, and fourth gesture sensor electrodes JE1, JE2, JE3, and JE4 respectively disposed at the top, bottom, left, and right of the first sensing area SAL.

The gesture sensor electrodes JE include at least one of a metal, a transparent conductive material, or various other conductive materials, and are therefore conductive. In some embodiments, the gesture sensor electrodes JE have a mesh structure. In addition, the gesture sensor electrodes JE may be provided as a single layer or a multi-layer structure, and the structure of the gesture sensor electrodes JE is not particularly limited.

Referring back to FIG. 1, in an embodiment, the antenna ANT is disposed in the second sensing area SA2, and is electrically insulated from the gesture sensor electrodes JE and the touch sensor electrodes SP.

In an embodiment, at least one of the gesture sensor electrodes JE includes at least one concave part whose width is less than an average width of the gesture sensor electrodes JE, and the antenna ANT is disposed at the concave part. For example, the second gesture sensor electrode JE2 includes four concave parts, and the antenna ANT is disposed in each of the four concave parts. Similarly, the third gesture sensor electrode JE3 includes four concave parts, and the antenna ANT is disposed in each of the four concave parts. The number of antennas ANT corresponds to a number of communication channels of a second driver GIC that will be described below. The number of antennas ANT changes based on the number of communication channels of the second driver GIC.

FIG. 1 shows that the antenna ANT is located at an upper side and a left side of the first sensing area SAL. However, embodiments of the present disclosure are not necessarily limited thereto. For example, in some embodiments, the antenna ANT is located at a lower side instead of the upper side of the first sensing area SA1, or is located at a right side instead of the left side of the first sensing area SAL.

A configuration of each of the antenna ANT and the gesture sensor electrodes JE will be described in more detail below with reference to FIGS. 5 to 8.

Each of first touch sensing lines SL1 is connected to one sensor row of a plurality of first touch sensor electrodes SP1 disposed along the first direction DR1. For example, each of the first touch sensing lines SL1 extends along a right side and a lower side of the base layer BSL from a first pad unit PDA1. Each of second touch sensing lines SL2 is connected to one sensor column of a plurality of second touch sensor electrodes SP2 disposed along the second direction DR2. For example, the second touch sensing lines SL2 extend along the lower side of the base layer BSL from the first pad unit PDA1 or are located adjacent to the lower side of the base layer BSL. However, the arrangement of the first touch sensing lines SL and the second touch sensing lines SL2 is not necessarily limited thereto.

The gesture sensing lines JL are respectively connected to the gesture sensor electrodes JE. For example, the gesture sensing lines JL extend along a left side and an upper side of the base layer BSL from a second pad unit PDA2. The gesture sensing lines JL do not interfere with or intersect the touch sensing lines SL. However, an arrangement of the gesture sensing lines SL is not necessarily limited thereto, and the arrangement of the gesture sensing lines JL can changed as long as the gesture sensing lines SL do not interfere with the touch sensing lines SL. For example, when the touch sensing lines SL extend along a first side of the base layer BSL, the gesture sensing lines JL extend along a second side of the base layer BSL, which is different from the first side, and the touch sensing lines SL and the gesture sensing lines JL do not intersect each other.

Each of the communication lines AL is connected to a corresponding antenna ANT. For example, similar to the gesture sensing lines JL, the communication lines AL extend along the left side and the upper side of the base layer BSL from the second pad unit PDA2. The communication lines AL do not interfere with or intersect the gesture sensing lines JL. In addition, the communication lines AL do not interfere with or intersect the touch sensing lines SL. However, an arrangement of the communication lines AL is not necessarily limited thereto. Similar to the gesture sensing lines JL, an arrangement of the communication lines AL can change as long as the communication lines AL do not interfere with the touch sensing lines SL.

The pad unit PDA is located adjacent to the lower side of the base layer BSL.

The pad unit PDA includes first pads PD1 that are electrically connected to the touch sensing lines SL, second pads PD2 that are electrically connected to the gesture sensing lines JL, and third pads PD3 that are electrically connected to the communication lines AL. The first pads PD1 are located in the first pad unit PDA1, and the second pads PD2 and the third pads PD3 are located in the second pad unit PDA2. The first pad unit PDA1 and the second pad unit PDA2 are spaced apart from each other.

In embodiments, the input sensing device TS, or the electronic device that includes the same, further includes a first driver TIC and a second driver GIC.

The first driver TIC is electrically connected to the touch sensor electrodes SP through the first pads PD1 of the first pad unit PDA and the touch sensing lines SL, and senses a touch of an object based on a sensing signal received from the touch sensor electrodes SP. For example, the first driver TIC senses an object's touch by using a touch sensing frame period as a duration unit.

The second driver GIC is electrically connected to the gesture sensor electrodes JE through second pads PD2 od the second pad unit PDA2 and the gesture sensing lines JL, and senses an object's approach or motion based on a sensing signal received from the gesture sensor electrodes JE. For example, the second driver GIC senses the object's approach or motion by using an approach sensing frame period as a duration unit. In an embodiment, the touch sensing frame period and the approach sensing frame period are independent and different from each other. For example, in an embodiment, touch sensing using the touch sensor electrodes SP and approach sensing using the gesture sensor electrodes JE, such as at least some of the touch sensor electrodes SP and the gesture sensor electrodes JE, can be performed in a time division manner. In another embodiment, the touch sensing frame period and the approach sensing frame period are equal to each other. For example, touch sensing using the touch sensor electrodes SP and approach sensing using only the gesture sensor electrodes JE can be simultaneously performed.

In addition, the second driver GIC is electrically connected to the antenna ANT through the third pads PD3 of the second pad unit PDA2 and the communication lines AL, and performs wireless communication with an external device by using the antenna ANT.

In an embodiment, each of the first driver TIC and the second driver GIC can be implemented as an integrated circuit (IC). In an embodiment, at least portions of the first driver TIC and the second driver GIC are integrated into one IC.

As described above, the input sensing device TS further includes the gesture sensor electrodes JE for approach sensing and the antenna ANT for wireless communication, in addition to the touch sensor electrodes SP for touch sensing.

In addition, the gesture sensing lines SL and the communication lines AL are arranged to not interfere with the touch sensing lines SL or intersect the touch sensing lines SL, so that deterioration of gesture sensing sensitivity and deterioration of communication sensitivity can be prevented.

Figure 5:
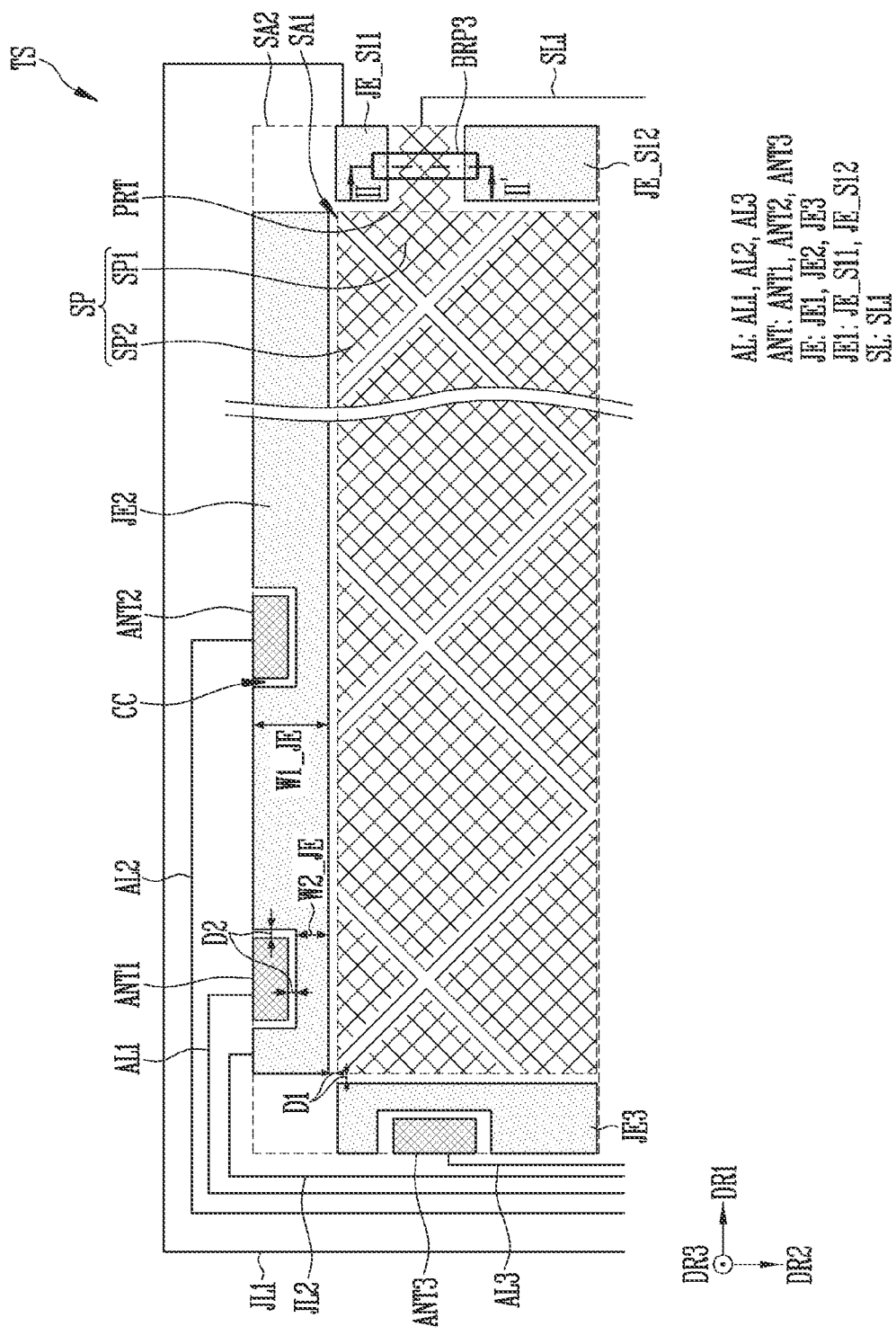
FIG. 5 is a plan view of an embodiment of an upper portion of an input sensing device shown in FIG. 1.
Figure 6:
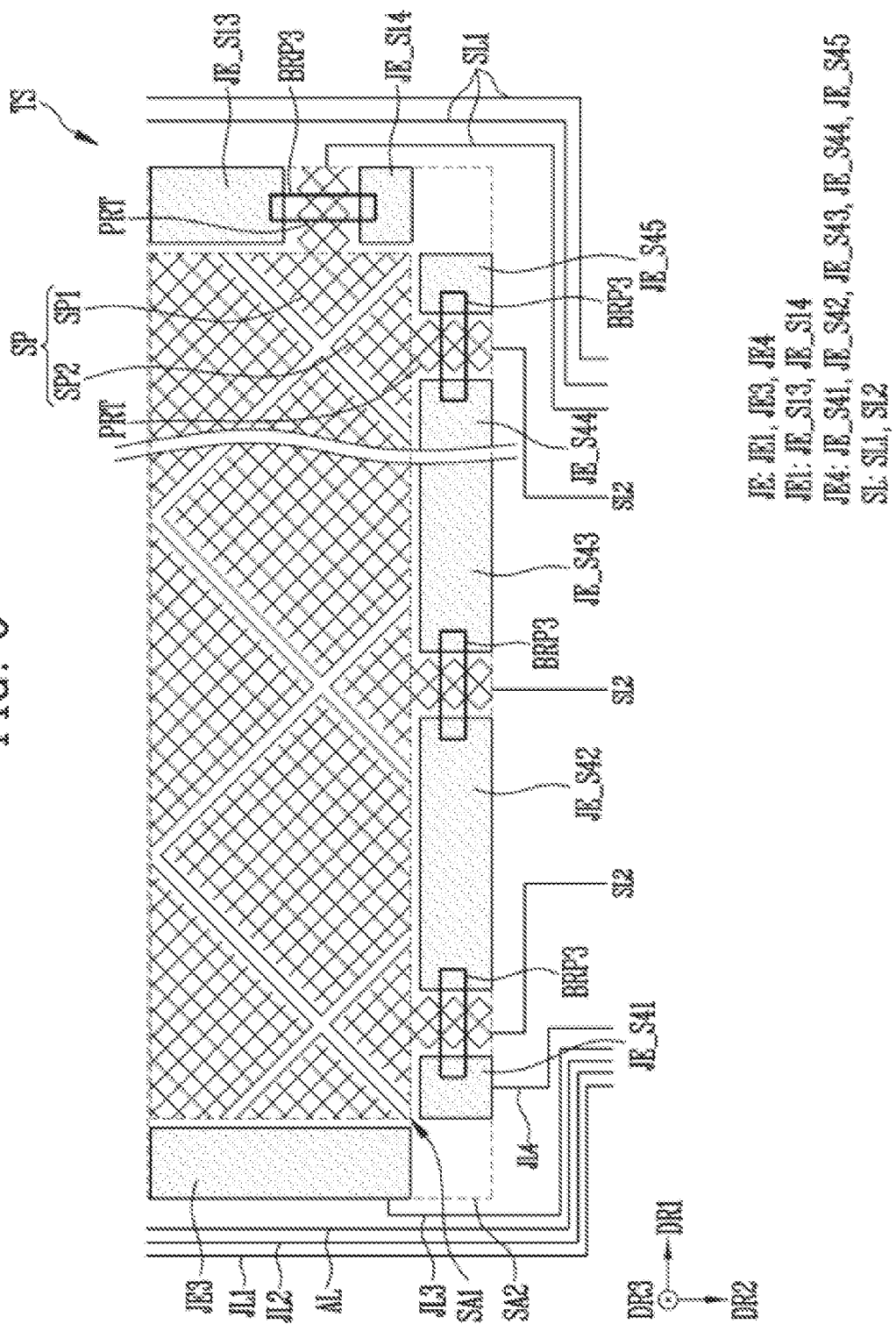
FIG. 6 is a plan view of an embodiment of a lower portion of an input sensing device shown in FIG. 1.
Figure 7:
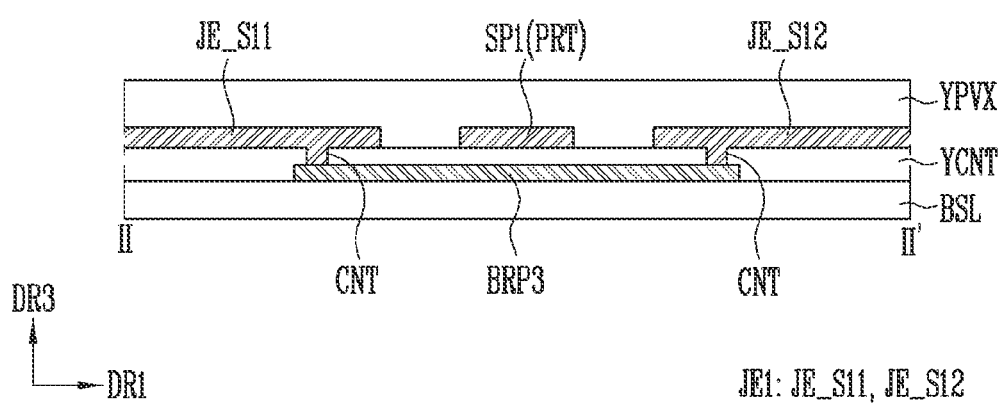
FIG. 7 is a sectional view taken along line II-II' in FIG. 5.
Figure 8:
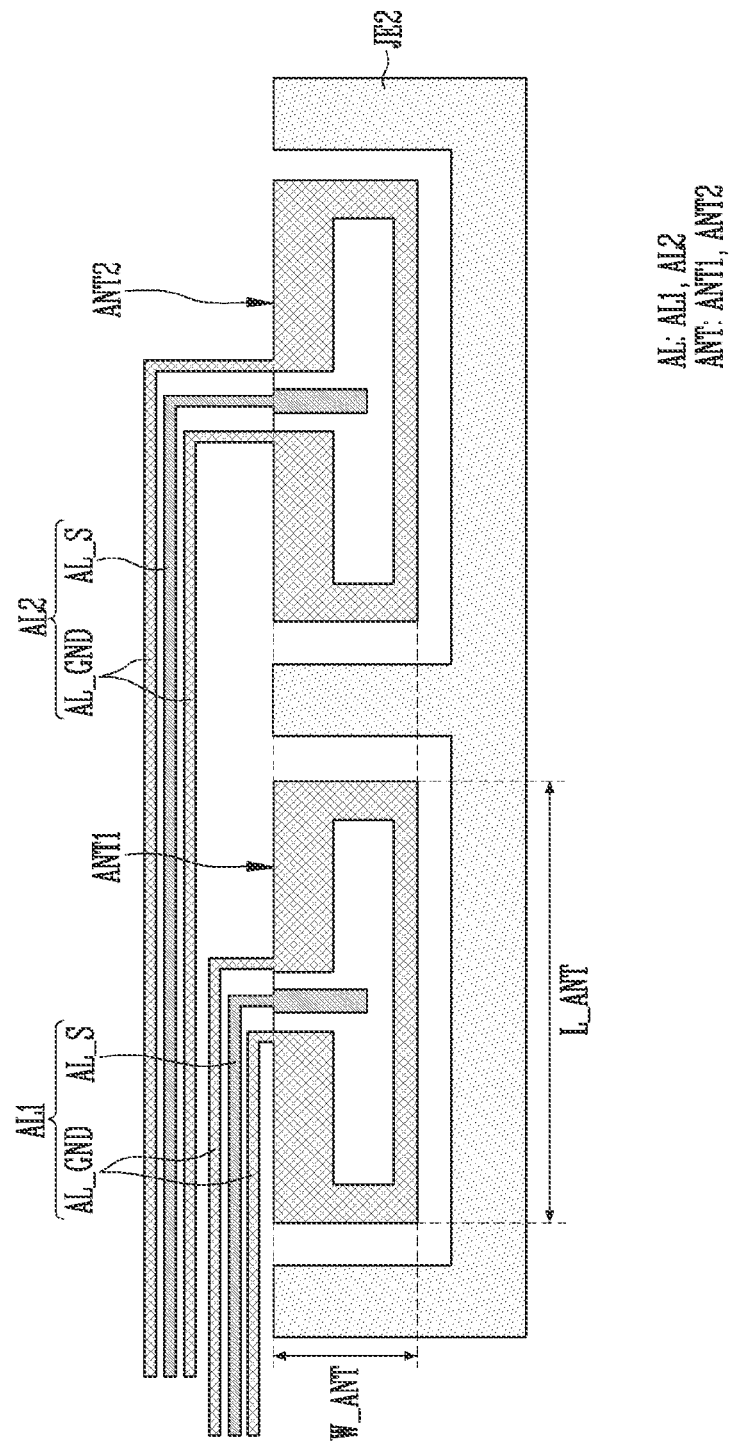
FIG. 8 is a plan view of an embodiment of an antenna in an input sensing device shown in FIG. 5.

FIG. 5 is a plan view of an embodiment of an upper portion of an input sensing device shown in FIG. 1. FIG. 6 is a plan view of an embodiment of a lower portion of an input sensing device shown in FIG. 1. FIG. 7 is a sectional view taken along line II-II' in FIG. 5. FIG. 8 is a plan view of an embodiment of an antenna in an input sensing device shown in FIG. 5.

Referring to FIGS. 1 and 5 to 8, in an embodiment, each of the touch sensor electrodes SP has a mesh structure that includes fine lines that extend in oblique directions that intersect the first and second directions DR1 and DR2.

In an embodiment, the gesture sensor electrodes JE are spaced apart from the touch sensor electrodes SP (or the first sensing area SA) by about 100 µm or more. Interference between the gesture sensor electrodes JE and the touch sensor electrodes SP, or interference between approach sensing and touch sensing, does not occur. For example, a first separation distance D1 between the gesture sensor electrodes JE and the touch sensor electrodes SP (or the first sensing area SA) is about 100 µm. As the first separation distance D1 becomes larger, interference is substantially eliminated, but the non-sensing area NSA also becomes larger. By considering this, the first separation distance D1 between the gesture sensor electrodes JE and the touch sensor electrodes SP (or the first sensing area SA) is about 500 µm or less.

In embodiments, at least one of the gesture sensor electrodes JE includes sub-electrodes separated from each other by the touch sensing lines SL and connected by a third bridge pattern BRP3. In a plan view, the third bridge pattern BRP3 crosses a protrusion part PRT of the touch sensor electrodes SP.

For example, as shown in FIG. 5, the first gesture sensor electrode JE1 includes an eleventh sub-electrode JE_S11 and a twelfth sub-electrode JE_S12 that are spaced apart from each other in the second direction DR2 by a first touch sensing line SL1, and the eleventh sub-electrode JE_S11 and the twelfth sub-electrode JE_S12 are electrically connected to each other by a third bridge pattern BRP3. For example, as shown in FIG. 6, the first gesture sensor electrode JE1 includes a thirteenth sub-electrode JE_S13 and a fourteenth sub-electrode JE_S14 that are spaced apart from each other in the second direction DR2 by a first touch sensing line SL1, and the thirteenth sub-electrode JE_S13 and the fourteenth sub-electrode JE_S14 are electrically connected to each other by a third bridge pattern BRP3. For example, as shown in FIG. 6, the fourth gesture sensor electrode JE4 includes a forty-first sub-electrode JE_S41, a forty-second sub-electrode JE_S42, and a forty-third sub-electrode JE_S43 that are spaced apart from each other in the first direction DR1 by the second touch sensing lines SL2, and third bridge patterns BRP3 connect the forty-first sub-electrode JE_S41 and the forty-second sub-electrode JE_S42 to each other, and the forty-second sub-electrode JE_S42 and the forty-third sub-electrode JE_S43 to each other. In addition, the fourth gesture sensor electrode JE4 include a forty-fourth sub-electrode JE_S44 and a forty-fifth sub-electrode JE_S45 that are spaced apart from each other by a second touch sensing line SL2, and the forty-fourth sub-electrode JE_S44 and the forty-fifth sub-electrode JE_S45 are electrically connected to each other by a third bridge pattern BRP3.

However, each of the second gesture sensor electrode JE2 and the third gesture sensor electrode JE3 includes only one electrode, and does not include any sub-electrodes. This is because each of the second gesture sensor electrode JE2 and the third gesture sensor electrode JE3 is spaced apart from the touch sensing lines SL. However, embodiments of the present disclosure are not necessarily limited thereto. For example, by considering a regular arrangement, etc., of the gesture sensor electrodes JE, the second gesture sensor electrode JE2 and the third gesture sensor electrode JE3 include sub-electrodes that respectively correspond to the fourth gesture sensor electrode JE4 and the first gesture sensor electrode JE1.

In an embodiment, the touch sensor electrodes SP connected to the touch sensing lines SL include protrusion parts PRT that protrude toward the touch sensing lines SL, or between sub-electrodes of the gesture sensor electrodes JE.

For example, as shown in FIG. 5, a first touch sensor electrode SP1 connected directly to a first sensing line SL1 includes a protrusion part PRT that protrudes between the eleventh and twelfth sub-electrodes JE_S11 and JE_S12 of the first gesture sensor electrode JEL. For example, as shown in FIG. 6, second touch sensor electrodes SP2 connected directly to second sensing lines SL2 include protrusion parts PRT that protrude between the forty-first to forty-fifth sub-electrodes JE_S41 to JE_S45 of the fourth gesture sensor electrode JE4.

In an embodiment, the sub-electrodes of the gesture sensor electrodes JE and the touch sensor electrodes SP, or the protrusion parts PRT of the touch sensor electrodes SP, are disposed in the same layer, and the third bridge patterns BRP3 are disposed in a different layer from the touch sensor electrodes SP or the protrusion parts PRT of the touch sensor electrodes SP.

Referring to FIG. 7, in an embodiment, the first touch sensor electrode SP1 (or the protrusion part PRT), the eleventh sub-electrode JE_S11, and the twelfth sub-electrode JE_S12 are disposed on the first sensor insulating layer YCNT. The third bridge pattern BRP3 is disposed on the base layer BSL, and is disposed in the same layer as the first bridge pattern BRP1 shown in FIG. 3. The eleventh sub-electrode JE_S11 and the twelfth sub-electrode JE_S12 are electrically connected to each other by the third bridge pattern BRP3 and contact holes CNT that penetrate the first sensor insulating layer YCNT.

For example, the touch sensing lines SL have a multi-layer structure, such as a structure that includes the first and second conductive patterns CP1 and CP2 shown in FIG. 3, to reduce resistance. The gesture sensor electrodes JE would not formed in the sensing area SA because the gesture sensor electrodes JE would intersect the multi-layer touch sensing lines SL. Alternatively, a conductive pattern located in a different layer from the first and second conductive patterns CP1 and CP2 shown in FIG. 3 could be additionally required to form the gesture sensor electrodes JE so that the gesture sensor electrodes JE intersect the multi-layer touch sensing lines SL, which would increase manufacturing cost of the input sensing device TS.

Accordingly, in the input sensing device TS shown in FIGS. 5 to 7, the second sensing area SA2 is ensured by removing portions of outermost touch sensor electrodes SP in the sensing area SA, and forming the gesture sensor electrodes JE in the second sensing area SA2. The gesture sensor electrode JE cross the protrusion parts PRT of the single layer touch sensor electrodes SP instead of the touch sensing lines SL. As the portions of the outermost touch sensor electrodes SP in the sensing area SA are removed, a shape and a size of the outermost touch sensor electrodes SP will differ from a shape and a size of the other touch sensor electrodes SP. For example, the outermost touch sensor electrodes SP have a pentagonal shape and the other touch sensor electrodes SP have a rhombic or a rectangular shape.

In addition, the touch sensing lines SL do not have a mesh structure, and the third bridge pattern BRP3 do not cross the touch sensing lines SL.

A first gesture sensing line JL1 is connected to the eleventh sub-electrode JE_S11 of the first gesture sensor electrode JE1, and extends along an upper side and a left side of the sensing area SA. This is because, when the first gesture sensing line JL1 extends along a right side of the sensing area SA, the length and resistance of the first gesture sensing line JL1 is small, but interference with the touch sensing lines SL can occur. A second gesture sensing line JL2 extends along the left side of the sensing area SA, and a third gesture sensing line JL3 and a fourth gesture sensing line JL4 are located adjacent to a lower side of the sensing area SA.

The antenna ANT is disposed is a concave part CC of each of the second and third gesture sensor electrodes JE2 and JE3, which do not interfere with the touch sensing lines SL. The concave part CC has a width W2_JE that is less than an average width W1_JE of the gesture sensor electrodes JE, or a part corresponding thereto. For example, the average width W1_JE is at least about 500 μm, and the width W2_JE is at least about 100 μm. For example, the concave art CC is formed at an outer side of each of the second and third gesture sensor electrodes JE2 and JE3, such as a side adjacent to an edge of the input sensing device TS. Interference between the communication lines AL that are connected to the antenna ANT and the gesture sensor electrodes JE, can be minimized.

For example, each of a first antenna ANT1 and a second antenna ANT2 is disposed in a concave part CC in the second gesture sensor electrode JE2. A third antenna ANT3 is disposed in a concave part CC in the third gesture sensor electrode JE3. Each antenna ANT has a shape that corresponds to a shape of the concave part CC of the gesture sensor electrodes JE. For example, each of the antenna ANT and the concave part CC has a rectangular shape, but embodiments of the present disclosure are not necessarily limited thereto.

In an embodiment, each antenna ANT is spaced apart from the gesture sensor electrodes JE by about 100 μm or more. Interference between the antenna ANT and the gesture sensor electrodes JE does not occur. For example, a second separation distance D2 between the antenna ANT and the gesture sensor electrodes JE is about 100 μm. As the second separation distance D2 becomes larger, the interference is substantially eliminated, but the non-sensing area NSA also becomes larger. By considering this, the second separation distance D2 between the antenna ANT and the gesture sensor electrodes JE is about 500 μm or less.

A width W_ANT of the antenna ANT is hundreds of μm. For example, by considering the average width W1_JE of the gesture sensor electrodes JE, the width W_ANT of the antenna ANT is about 300 μm. A length L_ANT of the antenna ANT ranges from a few mm to a few cm, and corresponds to a communication frequency, such as hundreds of MHz to tens of GHz.

A first communication line AL1 is connected to the first antenna ANT1, and extends along the upper side and left side of the sensing area SA. Similarly, a second communication line AL2 is connected to the second antenna ANT2, and extends along the upper side and the left side of the sensing area SA. A third communication line AL3 is connected to the third antenna ANT3, and extends along the left side of the sensing area SA. Interference between the communication lines AL and the touch sensing lines SL can be completely eliminated.

In an embodiment, each antenna ANT includes a first electrode and a second electrode that surrounds the first electrode, and each of the communication lines AL includes a pair of ground lines AL_GND connected to the second electrode and a signal line AL_S located between the pair of ground lines AL_GND and connected to the first electrode. As shown in FIG. 8, each of the first communication line AL1 and the second communication line AL2 includes a pair of ground lines AL_GND and a signal line AL_S. However, the antenna ANT and the communication lines AL are not necessarily limited thereto.

As described above, at least one of the gesture sensor electrodes JE includes sub-electrodes separated from each other by protrusion parts PRT of touch sensor electrodes SP and that are connected by a third bridge pattern BRP3. In addition, the third bridge pattern BRP3 is disposed in a different layer from the touch sensor electrodes SP, and overlaps a protrusion part of the touch sensor electrodes SP in a plan view. Thus, the gesture sensor electrodes JE are provided in the sensing area SA, and can minimize an area increase of the input sensing device TS.

In addition, the antenna ANT is disposed in a concave part CC of at least one of the gesture sensor electrode JE, such as a gesture sensor that does not interfere with the touch sensing lines SL or does not include any sub-electrodes. Thus, an input sensing device TS is provided that is compact while supporting communication.

Further, the gesture sensing lines JL and the communication lines AL are disposed in or extend to an area that differs from an area of the touch sensing lines SL. Thus, the gesture sensing lines JL and the communication lines AL do not intersect the touch sensing lines SL, and can minimize interference caused by the touch sensing lines SL.

Figure 9:
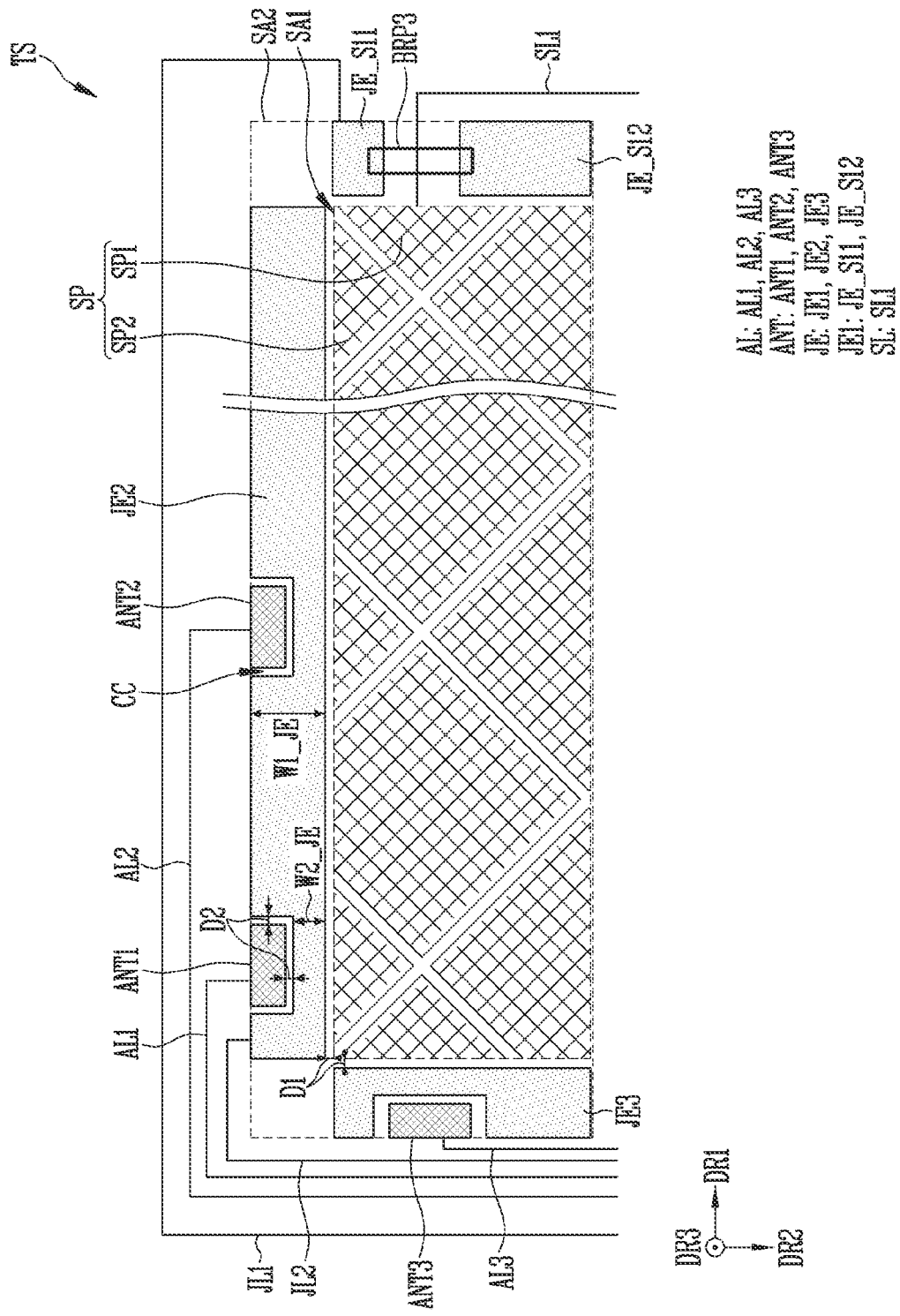
FIG. 9 is a plan view of an embodiment of an upper portion of an input sensing device shown in FIG. 1.

FIG. 9 is a plan view of an embodiment of an upper portion of an input sensing device shown in FIG. 1.

Referring to FIGS. 5 and 9, in an embodiment, an input sensing device TS shown in FIG. 9 is substantially identical or similar to the input sensing device TS shown in FIG. 5, except for a first touch sensing line SL. Therefore, repeated descriptions thereof may be omitted.

The first touch sensing line SL1 extends between the eleventh sub-electrode JE_S11 and the twelfth sub-electrode JE_S12 of the first gesture sensor electrode JE1. The third bridge pattern BRP3 overlaps the first touch sensing line SL1. A sectional structure of an intersection portion of the third bridge pattern BRP3 and the first touch sensing line SL in FIG. 9 is substantially identical to an embodiment shown in FIG. 7. For example, the first touch sensing line SL1, such as the first touch sensing line SL1 located between the eleventh sub-electrode JE_S11 and the twelfth sub-electrode JE_S12, is disposed in the same layer as the first touch sensor electrode SP1, and the third bridge pattern BRP3 is disposed in a different layer from the first touch sensing line SL1.

Figure 10:
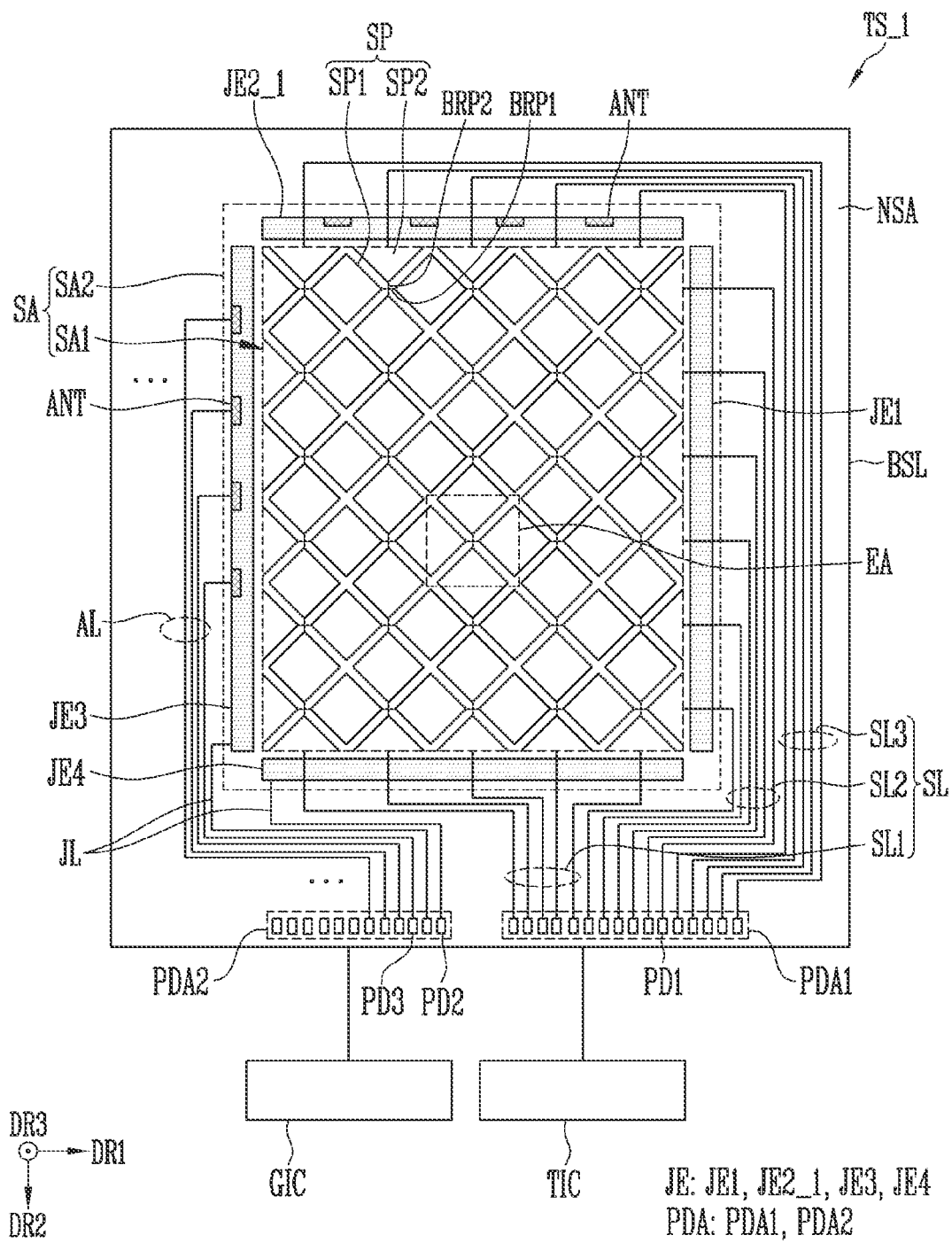
FIG. 10 is a schematic plan view of an embodiment of an input sensing device shown in FIG. 1.
Figure 11:
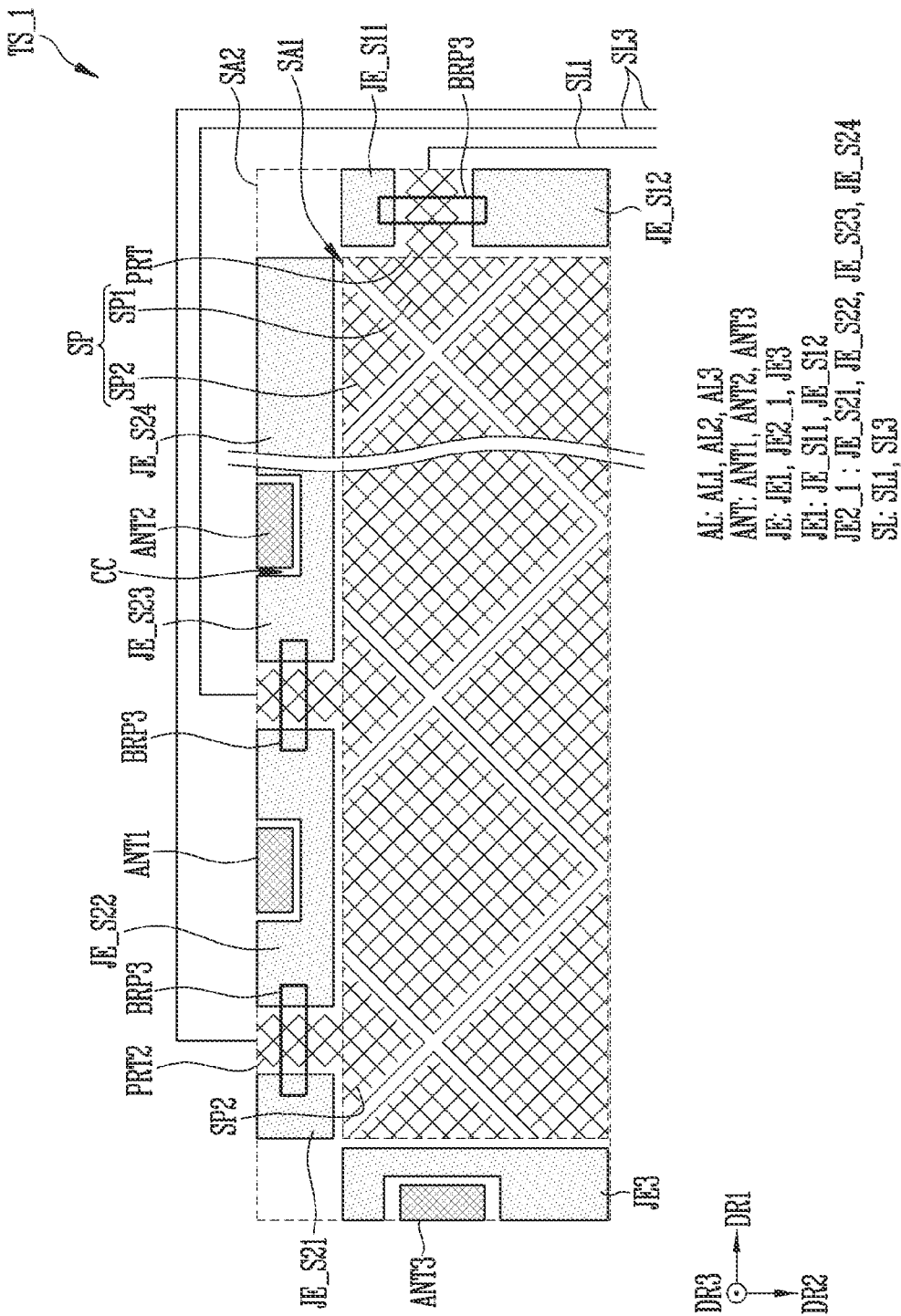
FIG. 11 is a plan view of an embodiment of an upper portion of an input sensing device shown in FIG. 5.

FIG. 10 is a schematic plan view of an embodiment of an input sensing device shown in FIG. 1. FIG. 11 is a plan view of an embodiment of an upper portion of an input sensing device shown in FIG. 5.

Referring to FIGS. 1, 5, 10, and 11, in an embodiment, an input sensing device TS_1 shown in FIGS. 10 and 11 is substantially identical or similar to the input sensing device TS shown in FIG. 1, except for a third touch sensing lines SL3 and a second gesture sensor electrode JE2_1. Therefore, repeated descriptions thereof may be omitted.

Each of the third touch sensing lines SL3 is connected to one sensor column that includes a plurality of second touch sensor electrodes SP2 disposed along the second direction DR2. For example, the third touch sensing lines SL3 extend from the first pad unit PDA1 along the lower side, the right side, and the upper side of the base layer BSL. For example, lines connected to the second touch sensor electrodes SP2 that transmit a sensing signal have a double path. The input sensing device TS acquires a sensing signal from the second touch sensor electrodes SP2 through not only the first touch sensing lines SL1 but also the third touch sensing lines SL3, so that touch sensitivity can be increased.

Similar to the fourth gesture sensor electrode JE4 described with reference to FIG. 6, the second gesture sensor electrode JE2_1 includes a twenty-first sub-electrode JE_S21, a twenty-second sub-electrode JE_S22, a twenty-third sub-electrode JE_S23, and a twenty-fourth sub-electrode JE_S24 that are spaced apart from each other in the first direction DR1 by the third touch sensing lines SL3, and each third bridge pattern BRP3 connects the twenty-first sub-electrode JE_S21 and the twenty-second sub-electrode JE_S22 to each other, and the twenty-second sub-electrode JE_S22 and the twenty-third sub-electrode JE_S23 to each other.

The second touch sensor electrodes SP2 connected to the third touch sensing lines SL3 include protrusion parts PRT that protrude toward the third touch sensing lines SL3, or between the sub-electrodes JE_S21 to JE_S24 of the second gesture sensor electrodes JE2_1.

The antenna ANT is disposed in a concave part CC of each of at least some of the sub-electrodes JE_S21 to JE_S24 of the second gesture sensor electrodes JE2_1. For example, the first antenna ANT1 is disposed in a concave part CC of the twenty-second sub-electrode JE_S22, and the second antenna ANT2 is disposed in a concave part CC of the twenty-third sub-electrode JE_S23. In some embodiments, when a concave part in which the antenna ANT can be disposed is formed in the twenty-first electrode JE_S21, the antenna ANT is disposed in the concave part of the twenty-first electrode JE_S21.

Figure 12:
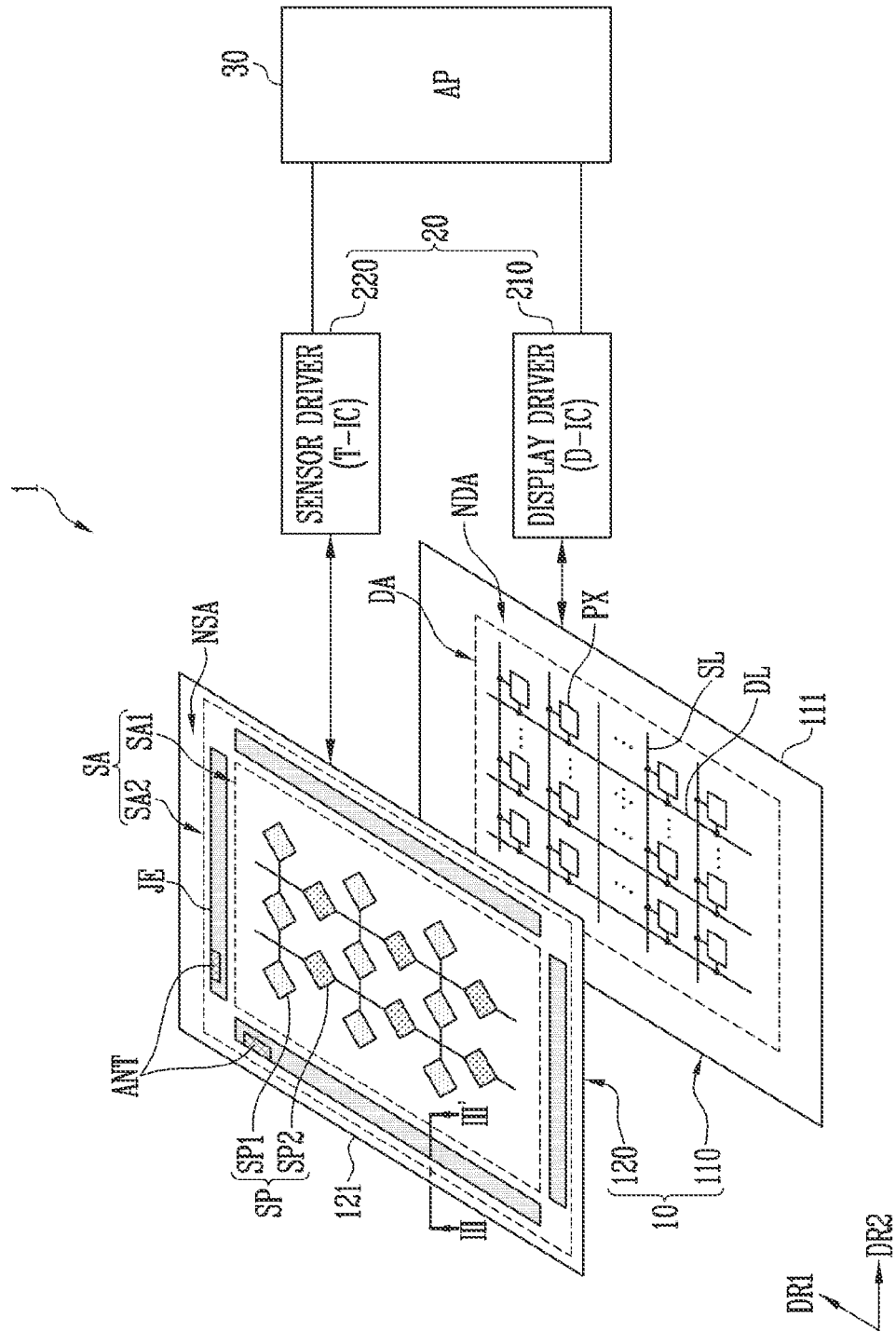
FIG. 12 illustrates a display device in accordance with embodiments of the present disclosure.

FIG. 12 illustrates a display device in accordance with embodiments of the present disclosure.

Referring to FIG. 12, in an embodiment, the display device 1 can be incorporated into an electronic device, such as a computer, a notebook computer (laptop), a cellular phone, a smart phone, a Personal Digital Assistant (PDA), a Portable Multimedia Player (PMP), a digital TV, a digital camera, a portable game console, a navigation device, a wearable device, an Internet of Things (IoT) device, an Internet of Everything (IoE) device, an electronic-book (e-book), a virtual reality (VR) device, an augmented reality (AR) device, a vehicle navigation system, a video phone, an observation system, an auto-focus system, a tracking system, and a movement sensing system.

The display device 1 includes a panel 10 and a driving circuit 20 that drives the panel 10. In addition, the display device 1 further includes an application processor (AP) 30, or is connected to the application processor 30.

The panel 10 includes a display unit 110 and a sensor unit 120. The display unit 110 may display an image. The sensor unit 120 can sense or detect an external input such as a touch, a pressure, a fingerprint, hovering, an approach, or a motion. For example, the panel 10 includes pixels PX, touch sensor electrodes SP that overlap at least some of the pixels PX, and gesture sensor electrodes JE. In an embodiment, the gesture sensor electrodes JE do not overlap the pixels PX, but embodiments of the present disclosure are not necessarily limited thereto. For example, in some embodiments, at least some of the gesture sensor electrodes JE overlap the pixels PX. The sensor unit 120 is the input sensing device TS described with reference to FIGS. 1 to 11. Therefore, repeated descriptions thereof may be omitted.

In an embodiment, the touch sensor electrodes SP include first touch sensor electrodes SP1 and second touch sensor electrodes SP2. In an embodiment, such as a self-capacitance type embodiment, the touch sensor electrodes SP include one type of sensor without distinguishing the first and second touch sensor electrodes SP1 and SP2 from each other.

The pixels PX display an image by using a display frame period as a duration unit. For example, the touch sensor electrodes SP sense an object's touch input, such as a user's finger or a stylus pen, by using a touch sensing frame period as a duration unit. The gesture sensor electrodes JE sense an object's approach or motion by using an approach sensing frame period as a duration unit. In an embodiment, the touch sensing frame period and the approach sensing frame period are included in one sensing frame period, but embodiments of the present disclosure are not necessarily limited thereto. In an embodiment, the touch sensing frame period and the display frame period are independent from or different each other. The touch sensing frame period and the display frame period may be synchronized with each other or unsynchronized.

In some embodiments, after the display unit 110 and the sensor unit 120 are manufactured separately from each other, the display unit 110 and the sensor unit 120 are coupled to overlap with each other in at least one area. In an embodiment, the display unit 110 and the sensor unit 120 are integrally manufactured. For example, the sensor unit 120 is formed directly on at least one substrate, such as an upper substrate or a lower substrate of a display panel or a thin film encapsulation layer, or another insulating layer or one of various types of functional layers of the display unit, such as an optical layer or a protective layer.

FIG. 12 illustrates an embodiment where the sensor unit 120 is disposed on a front surface, such as an upper surface on which an image is displayed, of the display unit 110, however, the position of the sensor unit 120 is not limited thereto. For example, the sensor unit 120 can be disposed on a rear surface or both surfaces of the display unit 110. For example, the sensor unit 120 is disposed in at least one edge area of the display unit 110.

The display unit 110 includes a display substrate 111 and a plurality of pixels PX disposed on the display substrate 111. The pixels PX are disposed in a display area DA of the display substrate 111.

The display substrate 111 includes the display area DA in which an image is displayed and a non-display area NDA at the periphery of the display area DA. In some embodiments, the display area DA is disposed in a central area of the display unit 110, and the non-display area NDA is disposed in an edge area of the display unit 110 that surrounds the display area DA.

The display substrate 111 may be a rigid substrate or a flexible substrate, and the material or property of the display substrate 111 is not particularly limited. For example, the display substrate 111 may be a rigid substrate made of glass or tempered glass, or a flexible substrate made of a thin plastic or metal film.

Scan lines SL and data lines DL, and the pixels PX connected to the scan lines SL and the data lines DL, are disposed in the display area DA. Pixels PX are selected by a turn-on level scan signal received from the scan lines SL, and are supplied with a data signal from the data lines DL, and emit light with a luminance that corresponds to the data signal. Accordingly, an image that corresponds to the data signal can be displayed in the display area DA. In the present disclosure, the structure, driving method, etc., of the pixels PX are not particularly limited. For example, each of the pixels PX can be implemented with various structures and/or driving methods that are currently known in the art.

Various types of lines and/or a built-in circuit, connected to the pixels PX of the display area DA are disposed in the non-display area NDA. For example, a plurality of lines that connect various power sources and supply various control signals to the display area DA can be disposed in the non-display area NDA. In addition, a scan driver, etc., can be further disposed in the non-display area NDA.

In the present disclosure, the type of the display unit 110 is not particularly limited. For example, the display unit 110 may be a self-luminescent display panel such as an organic light emitting display panel. However, when the display unit 110 is a self-luminescent display panel, the pixels PX are not necessarily limited including only an organic light emitting element. For example, a light emitting element of each of the pixels PX may be an organic light emitting diode, an inorganic light emitting diode, a quantum dot/well light emitting diode, etc. In some embodiments, a plurality of light emitting elements are included in each of the pixels PX. The plurality of light emitting elements may be connected in series, parallel, series/parallel, etc. Alternatively, in some embodiments, the display unit 110 is a non-light emitting display panel such as a liquid crystal display panel. When the display unit 110 is a non-light emitting display panel, the display device 1 additionally includes a light source such as a back-light unit.

The sensor unit 120 includes a sensor substrate 121, and touch sensor electrodes SP and gesture sensor electrodes JE disposed on the sensor substrate 121. The sensor substrate 121 is the base layer BSL shown in FIG. 1. The touch sensor electrodes SP and the gesture sensor electrode JE are disposed in a sensing area SA of the sensor substrate 121. The touch sensor electrodes SP are disposed in a first sensing area SA1 of the sensor substrate 121. The gesture sensor electrodes JE are disposed in a second sensing area SA2 of the sensor substrate 121. In addition, the sensor unit 120 further includes an antenna ANT. The antenna ANT is disposed in the second sensing area SA2 of the sensor substrate 121.

The sensor substrate 121 includes the sensing area SA that can sense a touch, an approach, etc., and a non-sensing area NSA at the periphery of the sensing area SA. In some embodiments, the sensing area SA overlaps at least part of the display area DA. For example, the sensing area SA corresponds to the display area DA, and the non-sensing area NSA corresponds to the non-display area NDA. When a touch input, etc., is provided to the display area DA, the touch input can be detected through the sensor unit 120.

The sensor substrate 121 may be a rigid or flexible substrate. In addition, the sensor substrate 121 may include at least one insulating layer. In addition, the sensor substrate 121 may be a transparent or translucent substrate, but embodiments of the present disclosure are not necessarily limited thereto, and the material and property of the sensor substrate 121 are not particularly limited. In some embodiments, at least one substrate, such as the display substrate 111, an encapsulation substrate, and/or a thin film encapsulation layer, of the display unit 110, or at least one insulating layer or functional layer disposed inside and/or on an outer surface of the display unit 110 can be used as the sensor substrate 121.

The driving circuit 20 includes the display driver 210 that drives the display unit 110 and the sensor driver 220 that drives the sensor unit 120. In an embodiment, each of the display driver 210 and the sensor driver 220 is an integrated circuit (IC), such as a display integrated circuit D-IC and a sensor integrated circuit T-IC. In an embodiment, at least a portion of the display driver 210 and at least a portion of the sensor driver 220 are integrated together into one IC.

The display driver 210 is electrically connected to the display unit 110 to drive the pixels PX. For example, the display driver 210 provides a data signal to the pixels PX. In an embodiment, the display driver 210 includes a data driver and a timing controller, and a scan driver is separately mounted in the non-display area NDA of the display unit 110. In an embodiment, the display driver 210 includes all or at least a portion of the data driver, the timing controller, and the scan driver.

The sensor driver 220 is electrically connected to the sensor unit 120 to drive the sensor unit 120. The sensor driver 220 includes a sensor transmitter and a sensor receiver. The sensor transmitter provides a driving signal to the second touch sensor electrodes SP2, and the sensor receiver receives a sensing signal from the first touch sensor electrodes SP1 and the gesture sensor electrodes JE. In some embodiments, the sensor transmitter provides a driving signal to some of the gesture sensor electrodes JE. In an embodiment, the sensor transmitter and the sensor receiver are integrated into one IC, but embodiments of the present disclosure are not necessarily limited thereto. The sensor driver 220 includes the first driver TIC and the second driver GIC that are shown in FIG. 1. The sensor driver 220 and the sensor unit 120 are the input sensing device TS shown in FIG. 1.

The application processor 30 is electrically connected to the display driver 210, and provides the display driver 210 with grayscales for the display frame period and timing signals. In addition, the application processor 30 is electrically connected to the sensor driver 220, and receives a sensing signal or input information, such as an input caused by an object and a position thereof, from the sensor driver 220I). For example, the application processor 30 determines an input, such as a touch input and a coordinate thereof, or an approach or a motion, caused by the object, based on the sensing signal. For example, the sensor driver 220 determines an input caused by the object based on the sensing signal, and the application processor 30 receives from the sensor driver 220 input information that corresponds to the determination. In addition, the application processor 30 can perform wireless communication with an external device by using the antenna ANT.

The application processor 30 may be at least one of a Graphics Processing Unit (GPU), a Central Processing Unit (CPU), or an Application Processor (AP), etc.

Figure 13:
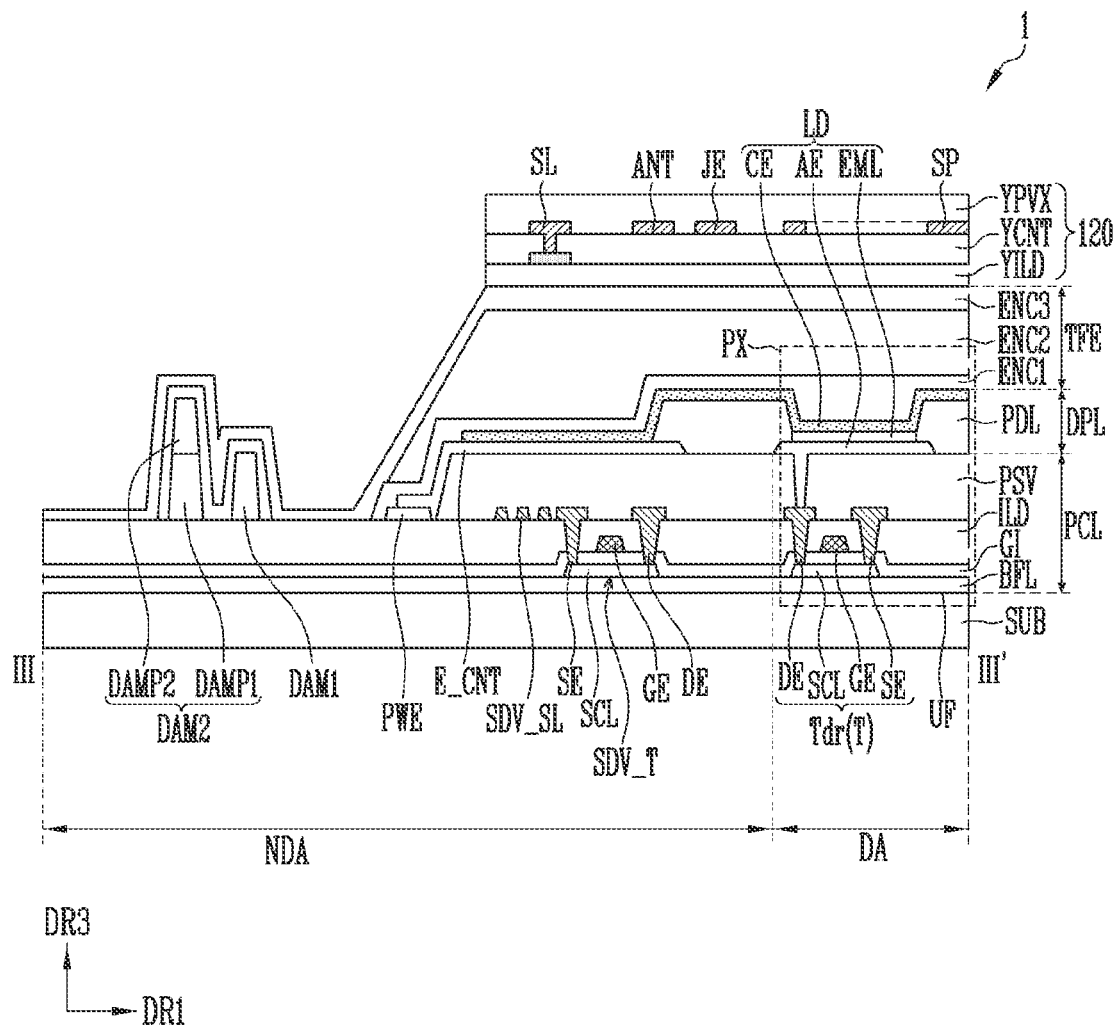
FIG. 13 is a sectional view of an embodiment of a display device taken along line III-III' in FIG. 12.

FIG. 13 is a sectional view of an embodiment of a display device taken along line III-III' shown in FIG. 12.

In FIG. 13, in an embodiment, a structure of the display device 1 is simplified and illustrated, such as that each electrode is illustrated as having a signal layer and each insulating layer is illustrated as having a single layer, but embodiments of the present disclosure are not necessarily limited thereto.

In an embodiment of the present disclosure, the term "being formed and/or provided in the same layer" means being formed by the same process and using the same material, and the term "being formed and/or provided in different layers" mean being formed by different processes and using different materials.

Referring to FIGS. 12 and 13, in an embodiment, the display device 1 includes a pixel PX and a touch sensor electrode SP in a display area DA, and a gesture sensor electrode JE, an antenna ANT, and a sensing line SL in a non-display area NDA. Hereinafter, a stacked structure of the display device 1 in the display area DA will be first described, and then a stacked structure of the display device 1 in the non-display area NDA will be described.

The display device 1 includes a pixel circuit layer PCL, a display element layer DPL, a thin film encapsulation layer TFE, and a sensor unit 120 that are sequentially stacked on a substrate SUB. In the display area DA, the pixel circuit layer PCL includes a buffer layer BFL, a driving transistor Tdr, and a protective layer PSV. The driving transistor Tdr controls a driving current provided to a light emitting element LD, and the structures of other transistors T in the pixel PX are substantially identical or similar to each other. Therefore, only the driving transistor Tdr is exemplarily illustrated.

The buffer layer BFL is disposed on one surface UF of the substrate SUB. The buffer layer BFL prevents an impurity from diffusing into the driving transistor Tdr. The buffer layer BFL is an insulating layer, and includes an inorganic material. For example, the inorganic material includes at least one of silicon nitride (SiNx), silicon oxide (SiOx), or silicon oxynitride (SiOxNy), and a metal oxide such as aluminum oxide (AlOx). The buffer layer BFL may be provided as a single layer or as a multi-layer that includes at least two layers. When the buffer layer BFL includes multiple layers, the layers may be formed of the same material or be formed of different materials. In an embodiment, the buffer layer BFL is omitted, depending on a material of the substrate SUB, a process condition, etc.

The driving transistor Tdr is disposed on the buffer layer BFL or the substrate SUB. The driving transistor Tdr includes a semiconductor pattern SCL, a gate electrode GE, a first terminal SE, and a second terminal DE. The first terminal SE is one of a source electrode or a drain electrode, and the second terminal DE is the other of the source electrode or the drain electrode. For example, when the first terminal SE is the source electrode, the second terminal DE is the drain electrode.

The semiconductor pattern SCL is disposed on the buffer layer BFL. The semiconductor pattern SCL includes a first contact region in contact with the first terminal SE and a second contact region in contact with the second terminal DE. A region located between the first contact region and the second contact region and that overlaps the gate electrode GE is a channel region of the driving transistor Tdr. The semiconductor pattern SCL is made of at least one of poly-silicon, amorphous silicon, or an oxide semiconductor, etc. The channel region is a semiconductor pattern that is not doped with an impurity, and may be an intrinsic semiconductor. Each of the first contact region and the second contact region is a semiconductor pattern doped with an impurity.

A gate insulating layer GI is disposed on the semiconductor pattern SCL and the buffer layer BFL. The gate insulating layer GI is an insulating layer, and includes an inorganic material. However, embodiments of the present disclosure are not necessarily limited thereto. In some embodiments, the gate insulating layer GI includes an organic material. The gate insulating layer GI may be a single layer or include multiple layers that include at least two layers.

The gate electrode GE is disposed on the semiconductor pattern SCL with the gate insulating layer GI interposed therebetween. For example, the gate electrode GE is disposed on the gate insulating layer GI. The gate electrode GE includes a conductive material. For example, the conductive material is a metal such as at least one of gold (Au), silver (Ag), aluminum (Al), molybdenum (Mo), chromium (Cr), titanium (Ti), nickel (Ni), neodymium (Nd) or copper (Cu).

In addition, in an embodiment, the gate electrode GE is formed as a single layer. However, embodiments of the present disclosure are not necessarily limited thereto, and in some embodiments, the gate electrode Ge includes multiple layers in which at least two materials are stacked.

An interlayer insulating layer ILD disposed on the gate electrode GE and the gate insulating layer GI. The interlayer insulating layer ILD is an insulating layer and includes an inorganic material. The interlayer insulating layer ILD may be a single layer or include multiple layers. In some embodiments, the interlayer insulating layer ILD includes an organic material.

The first terminal SE and the second terminal DE are respectively in contact with the first contact region and the second contact region of the semiconductor pattern SCL through contact holes that penetrate the interlayer insulating layer ILD and the gate insulating layer GI. For example, the first terminal SE is in contact with one of the first or second contact regions of the semiconductor pattern SCL, and the second terminal DE is in contact with the other of the first or second contact regions of the semiconductor pattern SCL. The first and second terminals SE and DE include a conductive material. Each of the first and second terminals SE and DE may be a single layer or include multiple layers.

An above-described embodiment includes separate first and second terminals SE and DE of the driving transistor Tdr that are electrically connected to the semiconductor pattern SCL through contact holes that penetrate the gate insulating layer GI and the interlayer insulating layer ILD. However, embodiments of the present disclosure are not necessarily limited thereto. In some embodiments, the first terminal SE of the driving transistor Tdr is one of the first or second contact regions adjacent to the channel region of the semiconductor pattern SCL, and the second terminal DE of the driving transistor Tdr is the other of the first or second contact regions adjacent to the channel region of the semiconductor pattern SCL. The second terminal DE of the driving transistor Tdr is electrically connected to a light emitting element LD of each pixel PX through a separate connection means that includes a bridge electrode, a contact electrode, etc.

In some embodiments, a sub-interlayer insulating layer is disposed over the first and second terminals SE and DE of the driving transistor Tdr. A first connection electrode that corresponds to the first terminal SE and a second connection electrode that corresponds to the second terminal DE are disposed on the sub-interlayer insulating layer. The first connection electrode is electrically connected to the first terminal SE disposed thereunder through a contact hole that penetrates the sub-interlayer insulating layer, and the second connection electrode is electrically connected to the second terminal DE disposed thereunder through a contact hole that penetrates the sub-interlayer insulating layer.

Although FIG. 13 illustrates an embodiment where the driving transistor Tdr has a top-gate structure, embodiments of the present disclosure are not necessarily limited thereto. For example, in some embodiments, the driving transistor Tdr has a bottom-gate structure.

The protective layer PSV is disposed on the driving transistor Tdr and the interlayer insulating layer ILD.

The protective layer PSV is an insulating layer, and may include an organic layer, an inorganic layer, or an organic layer disposed on an inorganic layer. The inorganic layer includes an inorganic material. The organic layer includes an organic material. For example, the organic material is at least one of an acrylic resin, an epoxy resin, a phenolic resin, a polyamide resin, a polyimide resin, an unsaturated polyester resin, a poly-phenylene ether resin, a poly-phenylene sulfide resin, or a benzocyclobutene resin.

The display element layer DPL is disposed on the protective layer PSV.

The display element layer DPL includes the light emitting element LD, which is disposed on the protective layer PSV and emits light. The light emitting element LD includes first and second electrodes AE and CE and a light emitting layer EML interposed between the first and second electrodes AE and CE. One of the first or second electrodes AE and CE is an anode electrode, and the other of the first or second electrodes AE and CE is a cathode electrode. For example, the first electrode AE is the anode electrode, and the second electrode CE is the cathode electrode. When the light emitting element LD is a top-emission organic light emitting diode, the first electrode AE is a reflective electrode, and the second electrode CE is a transmissive electrode.

The first electrode AE is electrically connected to the second terminal DE of the driving transistor Tdr through a contact hole that penetrates the protective layer PSV. The first electrode AE includes a reflective layer that can reflect light and a transparent conductive layer disposed on the top or the bottom of the reflective layer. For example, the transparent conductive layer includes a transparent conductive material, and the transparent conductive material is at least one of ITO, IZO, IGZO or ITZO, or a conductive polymer such as PEDOT. The reflective layer includes a metal such as silver (Ag).

The display element layer DPL includes a pixel defining layer PDL that includes an opening that exposes a portion of the first electrode AE, such as a top surface of the first electrode AE. The pixel defining layer PDL is an insulating layer, and includes an organic material.

The light emitting layer EML is disposed in an area that corresponds to the opening of the pixel defining layer PDL. For example, the light emitting layer EML is disposed on the exposed surface of the first electrode AE. The light emitting layer EML has a multi-layer thin film structure that includes at least a light generation layer. The light emitting layer EML includes a hole injection layer that injects holes, a hole transport layer that increases a hole recombination probability by suppressing movement of electrons, the light generation layer that emits light by recombination of the injected electrons and holes, a hole blocking layer that suppresses the movement of the holes that are not combined in the light generation layer, an electron transport layer that smoothly transports the electrons to the light generation layer, and an electron injection layer that injects the electrons.

The color of light generated by the light generation layer is one of red, green, blue, or white, but embodiments of the present disclosure are not necessarily limited thereto. For example, in some embodiments, the color of light generated in the light generation layer of the light emitting layer EML is one of magenta, cyan, or yellow. The hole injection layer, the hole transport layer, the hole blocking layer, the electron transport layer, and the electron injection layer correspond to a common layer commonly provided on all of the pixels PX.

The second electrode CE is disposed on the light emitting layer EML. In an embodiment, the second electrode CE is a common layer commonly provided on all of the pixels PX. However, embodiments of the present disclosure are not necessarily limited thereto. The second electrode CE is a transmissive electrode, and includes a transparent conductive material.

The thin film encapsulation layer TFE is disposed on the second electrode CE.

The thin film encapsulation layer TFE is provided as multiple layers. The thin film encapsulation layer TFE includes a plurality of insulating layers that cover the light emitting element LD. For example, the thin film encapsulation layer TFE includes at least one inorganic layer and at least one organic layer. For example, the thin film encapsulation layer TFE has a structure in which an inorganic layer and an organic layer are alternately stacked. In some embodiments, the thin film encapsulation layer TFE is an encapsulation substrate that is disposed over the light emitting element LD and is bonded to the substrate SUB through a sealant.

The thin film encapsulation layer TFE includes first, second, and third encapsulation layers ENC1, ENC2, and ENC3. The first encapsulation layer ENC1 is disposed on the display element layer DPL, and covers the entire display area DA and at least a portion of the non-display area NDA. The second encapsulation layer ENC2 is disposed on the first encapsulation layer ENC1, and covers the entire display area DA and at least a portion of the non-display area NDA. The third encapsulation layer ENC3 is disposed on the second encapsulation layer ENC2, and covers the entire display area DA and at least a portion of the non-display area NDA. In some embodiments, the third encapsulation layer ENC3 covers the entire display area DA and the entire non-display area NDA. The first and third encapsulation layers ENC1 and ENC3 are formed of an inorganic material, and the second encapsulation layer ENC2 is formed of an organic material.

FIG. 13 shows that the display element layer DPL includes the light emitting element LD that includes the first electrode AE, the light emitting layer EML, and the second electrode CE. However, embodiments of the present disclosure are not necessarily limited thereto. In some embodiments, the display element layer DPL includes a subminiature micro scale or nano scale inorganic light emitting element that has a structure in which a nitride-based semiconductor is grown.

The sensor unit 120 is disposed on the thin film encapsulation layer TFE. The sensor unit 120 is disposed directly on the thin film encapsulation layer TFE by using the thin film encapsulation layer TFE as a base layer. For example, the sensor unit 120 is directly formed on the thin film encapsulation layer TFE through a process subsequent to a process that forms the thin film encapsulation layer TFE.

The sensor unit 120 includes insulating layers, such as a third sensor insulating layer YILD, a first sensor insulating layer YCNT, and a second sensor insulating layer YPVX that are sequentially stacked on the thin film encapsulation layer TFE. In addition, the sensor unit 120 includes the touch sensor electrode SP, the gesture sensor electrode JE, the antenna ANT, and the sensing line SL that are disposed between the insulating layers, such as between the third, first, and second sensor insulating layers YILD, YCNT, and YPVX. The touch sensor electrode SP is provided in the display area DA. In an embodiment, the gesture sensor electrode JE, the antenna ANT, and the sensing line SL are provided in the non-display area NDA, but embodiments of the present disclosure are not necessarily limited thereto. In some embodiments, the gesture sensor electrode JE and the antenna ANT are provided in the display area DA.

The touch sensor electrode SP of the display area DA will be first described, and the gesture sensor electrode JE, the antenna ANT, and the sensing line SL will then be described together with other components of the non-display area NDA.

The third sensor insulating layer YILD is a buffer layer, and includes an inorganic material. However, embodiments of the present disclosure are not necessarily limited thereto. In some embodiments, the third sensor insulating layer YILD is omitted.

The first sensor insulating layer YCNT is disposed on the third sensor insulating layer YILD. The first sensor insulating layer YCNT is an insulating layer, and includes an organic material. However, embodiments of the present disclosure are not necessarily limited thereto.

The touch sensor electrode SP is disposed on the first sensor insulating layer YCNT. The touch sensor electrode SP is disposed above the light emitting element LD (or the pixel PX), and does not overlap the light emitting element LD in a third direction DR3. For example, the touch sensor electrode SP has a mesh structure, and includes an opening that corresponds to the light emitting element LD.

The second sensor insulating layer YPVX is disposed on the first sensor insulating layer YCNT and covers the touch sensor electrode SP.

A driver and a line part that are included in the pixel circuit layer PCL are located in the non-display area NDA. The driver includes at least one driver transistor SDV_T formed by the same process as the driving transistor Tdr of the pixel PX. The driver transistor SDV_T includes a semiconductor pattern SCL, a gate electrode GE, a first terminal SE, and a second terminal DE. The line part includes signal lines SDV_SL that connect the driver and the pixel PX to each other. The signal lines SDV_SL correspond to a fan-out line.

In addition, a power electrode PWE that receives a driving power source, such as a constant voltage, and a connection electrode E_CNT connected to the power electrode PWE are disposed in the non-display area NDA. The power electrode PWE is disposed outward from the signal lines SDV_SL, at an outside of the display device 1. The connection electrode E_CNT electrically connects the power electrode PWE and the second electrode CE of the light emitting element LD to each other as shown in FIG. 13. In an embodiment, the connection electrode E_CNT is formed by the same process of the first electrode AE of the light emitting element LD, and includes the same material as the first electrode AE. However, embodiments of the present disclosure are not necessarily limited thereto. In some embodiments, the connection electrode E_CNT is provided in the same layer as one of the conductive layers in the pixel circuit layer PCL so that the connection electrode E_CNT electrically connects the power electrode PWE and the second electrode CE to each other.

Dams DAM1 and DAM2 are provided at an edge of the display device 1. For example, the dams DAM1 and DAM2 are disposed along the edge of the display device 1 in a plan view. A second dam DAM2 is disposed outward from a first dam DAM1. The first dam DAM1 is simultaneously formed with the protective layer PSV of the pixel circuit layer PCL. The second dam DAM2 includes an upper part DAMP1 simultaneously formed with the protective layer PSV of the pixel circuit layer PCL and an upper part DAMP1 simultaneously formed with the pixel defining layer PDL of the display element layer DPL. In some embodiments, the dams DAM1 and DAM2 are simultaneously formed with at least one of insulating layers of the pixel circuit layer PCL. The dams DAM1 and DAM2 prevent a liquid organic material from overflowing into an outer area of the substrate SUB in a process of forming an organic layer, such as the second encapsulation layer ENC2 of the thin film encapsulation layer TFE.

The gesture sensor electrode JE is disposed on the first sensor insulating layer YCNT. The antenna ANT is disposed on the first sensor insulating layer YCNT, and is located outward from the gesture sensor electrode JE, toward the outside of the display device 1. In some embodiments, the antenna ANT is disposed between the third sensor insulating layer YILD and the first sensor insulating layer YCNT.

The sensing line SL is disposed outward from the gesture sensor electrode JE. The sensing line SL has multiple layers. For example, the sensing line SL includes a first conductive pattern disposed on the third sensor insulating layer YILD and a second conductive pattern disposed on the first sensor insulating layer YCNT. The second conductive pattern overlaps the first conductive pattern in the third direction DR3. The second conductive pattern is electrically connected to the first conductive pattern through a contact hole that penetrates the first sensor insulating layer YCNT.

Figure 14:
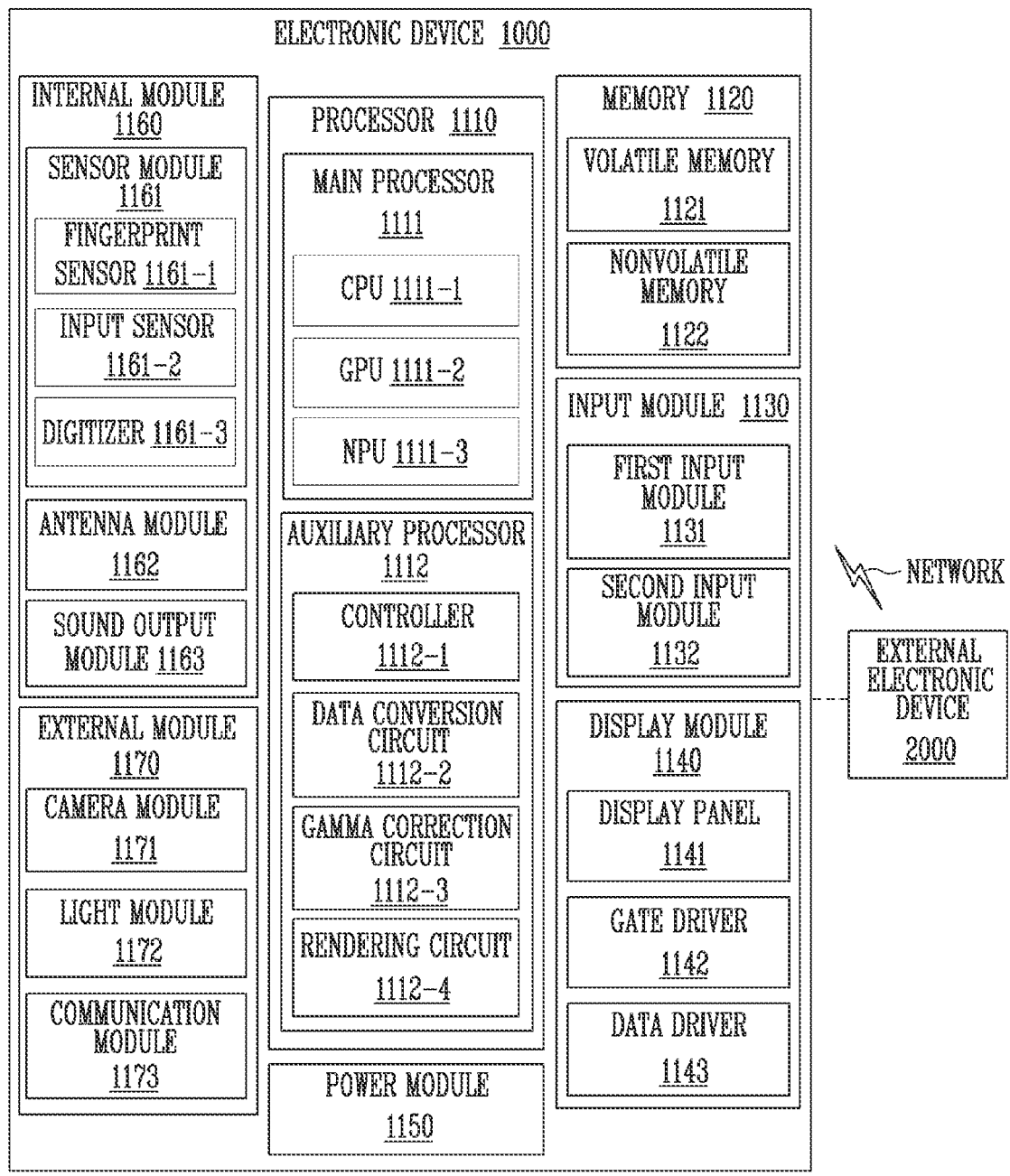
FIG. 14 illustrates an electronic device in accordance with embodiments of the present disclosure.

FIG. 14 illustrates an electronic device in accordance with embodiments of the present disclosure.

The electronic device 1000 can output various information through a display module 1140. The display module 1140 corresponds to at least a portion of the display device 1 shown in FIG. 12. When a processor 1110 executes an application stored in a memory 1120, the display module 1140 provides application information to a user through a display panel 1141. The processor 1110 corresponds to the application processor 30 shown in FIG. 12, and the display panel 1141 corresponds to the display unit 110 shown in FIG. 12.

The processor 1110 acquires an external input through an input module 1130 or a sensor module 1161, and executes an application that corresponds to the external input. At least a portion of the sensor module 1161 corresponds to the input sensing device TS shown in FIG. 1, or the sensor unit 120 and the sensor driver 220 shown in FIG. 12. For example, when a user selects a camera icon displayed on the display panel 1141, the processor 1110 acquires the user input through an input sensor 1161-2, and activates a camera module 1171. The processor 1110 transmits to the display module 1140 image data that corresponds to a photographed image acquired through the camera module 1171. The display module 1140 displays an image that corresponds to the photographed image through the display panel 1141.

For example, when personal information authentication is performed in the display module 1140, a fingerprint sensor 1161-1 acquires input fingerprint information as input data. The processor 1110 compares the input data acquired through the fingerprint sensor 1161-1 with authentication data stored in the memory 1120, and executes an application based on a comparison result. The display module 1140 displays information related to the application through the display panel 1141.

For another example, when a music streaming icon displayed on the display module 1140 is selected, the processor 1110 acquires the user input through the input sensor 1161-2, and activates a music streaming application stored in the memory 1120. When a music play command is input to the music streaming application, the processor 1110 activates a sound output module 1163, thereby providing the user with sound information that accords with the music play command.

In the above, operations of the electronic device 1000 have been briefly described. Hereinafter, components of the electronic device 1000 will be described in detail. Some of the components of the electronic device 1000 that will be described below are integrated as one component, or one component may be separated into and provided as two or more components.

Referring to FIG. 14, in an embodiment, the electronic device 1000 communicates with an external electronic device 2000 through a network, such as a short-range wireless communication network or a long-range wireless communication network. In an embodiment, the electronic device 1000 includes the processor 1110, the memory 1120, the input module 1130, the display module 1140, a power module 1150, an internal module 1160, and an external module 1170. In an embodiment, at least one of the above-described components of the electronic device 1000 can be omitted, or one or more other components can be added. In an embodiment, some components, such as the sensor module 1161, an antenna module 1162, and/or the sound output module 1163, of the above-described components can be integrated into another component, such as the display module 1140.

The processor 1110 controls at least one component, such as a hardware or software component, of the electronic device 1000 that is connected to the processor 1110 by executing software, and performs various processes or calculations. In an embodiment, as at least a part of the data processes and calculations, the processor 1110 stores in a volatile memory 1121 commands or data received from another component, such as the input module 1130, the sensor module 1161, or a communication module, processes the commands or data stored in the volatile memory 1121, and stores result data in a nonvolatile memory 1122.

The processor 1110 includes a main processor 1111 and an auxiliary processor 1112. The main processor 1111 corresponds to the application processor 30 shown in FIG. 12, and the auxiliary process 1112 corresponds to the driving circuit 20 shown in FIG. 12.

The main processor 1111 includes at least one of a central processing unit (CPU) 1111-1 or an application processor (AP). The main processor 1111 further includes at least one of a graphic processing unit (GPU) 1111-2, a communication processor, or an image signal processor. The main processor 1111 further includes a neural processing unit (NPU) 1111-3. The NPU 1111-3 processes an artificial intelligence (AI) model, and the AI model can be generated through machine learning. The AI model includes a plurality of artificial neural network layers. An artificial neural network is at least one of a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks, or combinations thereof, but embodiments of the present disclosure are not necessarily limited to the above-described example. The AI model may additionally or alternatively include a software structure, in addition to a hardware structure. At least two of the above-described processing units and the above-described processors may be implemented in one integrated component, such as a single chip, or implemented as independent components, such as a plurality of chips.

The auxiliary processor 1112 includes a controller 1112-1. The controller 1112-1 includes an interface conversion circuit and a timing control circuit. The controller 1112-1 receives an image signal from the main processor 1111, and converts a data format of the image signal to a format suitable for the display module 1140, thereby outputting image data. The controller 1112-1 outputs various control signals that drive the display module 1140.

The auxiliary processor 1112 further includes a data conversion circuit 1112-2, a gamma correction circuit 1112-3, a rendering circuit 1112-4, etc. The data conversion circuit 1112-2 receives image data from the controller 1112-1, and compensates the image data such that an image is displayed with a desired luminance according to a characteristic of the electronic device 1000 or a user's setting, or converts the image data for power consumption reduction, afterimage compensation, etc. The gamma correction circuit 1112-3 converts image data and/or a gamma reference voltage, etc., such that an image displayed in the electronic device 1000 has a desired gamma characteristic. The rendering circuit 1112-4 receies image data from the controller 1112-1 and renders the image data by considering a pixel arrangement of the display panel 1141, etc. At least one of the data conversion circuit 1112-2, the gamma correction circuit 1112-3, and the rendering circuit 1112-4 may be integrated with another component, such as the main processor 1111 or the controller 1112-4. At least one of the data conversion circuit 1112-2, the gamma correction circuit 1112-3, or the rendering circuit 1112-4 may be integrated into a data driver 1143 which will be described below.

The memory 1120 stores various data used by components, such as the processor 1110 or the sensor module 1161, of the electronic device 1000, and inputs or outputs data about an associated command. The memory 1120 includes at least one of the volatile memory 1121 and/or the nonvolatile memory 1122.

The input module 1130 receives commands or data to be used by a component, such as the processor 1110, the sensor module 1161, or the sound output module 1163, of the electronic device 1000 from a user or the external electronic device 2000.

The input module 1130 includes a first input module 1131 to which a command or data is received from the user and a second input module 1132 to which a command or data is received from the external electronic device 2000. The first input module 1131 includes one or more of a microphone, a mouse, a keyboard, a key, such as a button, or a pen, such as a passive pen or an active pen. The second input module 1132 supports a specified protocol that can connect the electronic device 1000 to the external electronic device 2000 by wired or wireless communication. In an embodiment, the second input module 1132 includes at least one of a high definition multimedia interface (HDMI), a universal serial bus (USB) interface, an SD card interface, or an audio interface. The second input module 1132 also includes a connector, such as an HDMI connector, a USB connector, an SD card connector, or an audio connector, such as a headphone connector, that can physically connect the electronic device 1000 to the external electronic device 2000.

The display module 1140 visually provides information to the user. The display module 1140 includes the display panel 1141, a gate driver 1142, and the data driver 1143. The display module 1140 may further include a window that protects the display panel 1141, a chassis, and a bracket.

The display panel 1141 is one of a liquid crystal display panel, an organic light emitting display panel, or an inorganic light emitting display panel, and the type of the display panel 1141 is not particularly limited. The display panel 1141 may be rigid or flexible in which the display panel 1141 is rollable or foldable. The display module 1140 may further include a supporter that supports the display panel 1141, a bracket, a heat dissipation member, etc.

The gate driver 1142 is a driving chip, and may be mounted in the display panel 1141. In addition, the gate driver 1142 may be integrated in the display panel 1141. For example, the gate driver 1142 includes at least one of an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit that is embedded in the display panel 1141. The gate driver 1142 receives a control signal from the controller 1112-1, and outputs scan signals to the display panel 1141 in response to the control signal.

The display panel 1141 may further include an emission driver. The emission driver outputs an emission control signal to the display panel 1141 in response to a control signal received from the controller 1112-1. The emission driver may be formed separately from the gate driver 1142, or may be integrated with the gate driver 1142.

The data driver 1143 receives a control signal from the controller 1112-1, and converts image data into an analog data voltages, and then outputs data voltages to the display panel 1141 in response to the control signal.

The data driver 1143 may be integrated with another component, such as the controller 1112-1. Functions of the interface conversion circuit and the timing control circuit of the controller 1112-1, which have been described above, may be integrated in the data driver 1143.

The display module 1140 may further include an emission driver, a voltage generating circuit, etc. The voltage generating circuit outputs various voltages for driving the display panel 1141.

The power module 1150 supplies power to at least one component of the electronic device 1000. The power module 1150 includes a battery that charges a power voltage. The battery may include a primary cell that is not rechargeable, a rechargeable secondary cell, or a fuel cell. The power module 1150 includes a power management integrated circuit (PMIC). The PMIC supplies an optimized power source to each of the above-described modules, and which will be described below. The power module 1150 may include a wireless power transmission/reception member electrically connected to the battery. The wireless power transmission/reception member may include a plurality of coil-shaped antenna radiators.

The electronic device 1000 further includes the internal module 1160 and the external module 1170. The internal module 1160 includes the sensor module 1161, the antenna module 1162, and the sound output module 1163. The external module 1170 includes the camera module 1171, a light module 1172, and the communication module 1173.

The sensor module 1161 senses an input caused by a user's body or a pen's input in the first input module, and generates an electrical signal or data value that corresponds to the input. The sensor module 1161 includes at least one of the fingerprint sensor 1161-1, the input sensor 1161-2, and/or a digitizer 1161-3.

The fingerprint sensor 1161-1 generates a data value that corresponds to a user's fingerprint. The fingerprint sensor 1161-1 includes one of an optical type fingerprint sensor or a capacitance type fingerprint sensor.

The input sensor 1161-2 generates a data value that corresponds to coordinate information of the user's input caused or the pen's input. The input sensor 1161-2 generates, as a data value, a capacitance variation caused by the input. The input sensor 1161-2 senses an input caused by a passive pen, or transmits/receives data to/from an active pen.

The input sensor 1161-2 can measure a biometric signal, such as pressure, moisture or body fat. For example, when the user does not move for a period of time while a user's body part is in contact with a sensor layer or a sensing panel, the input sensor 1161-2 outputs information to the display module 1140 by sensing a biometric signal, based on a change in electric field, caused by the body part.

The digitizer 1161-3 generates a data value that corresponds to the coordinate information of the pen's input. The digitizer 1161-3 generates, as a data value, an electromagnetic variation caused by the input. The digitizer 1161-3 senses an input caused by a passive pen, or transmits/receives data to/from an active pen.

At least one of the fingerprint sensor 1161-1, the input sensor 1161-2, or the digitizer 1161-3 may be implemented as a sensor layer formed on the display panel 1141 through a continuous process. One or more of the fingerprint sensor 1161-1, the input sensor 1161-2, or the digitizer 1161-3 may be disposed at an upper side of the display panel 1141, and a remainder of the fingerprint sensor 1161-1, the input sensor 1161-2, or the digitizer 1161-3 may be disposed at a lower side of the display panel 1141.

At least two of the fingerprint sensor 1161-1, the input sensor 1161-2, or the digitizer 1161-3 are integrated into one sensing panel through the same process. When at least two of the fingerprint sensor 1161-1, the input sensor 1161-2, and the digitizer 1161-3 are integrated into one sensing panel, the sensing panel is disposed between the display panel 1141 and the window disposed at an upper side of the display panel 1141. In an embodiment, the sensing panel is disposed on the window, and the position of the sensing panel is not particularly limited.

At least one of fingerprint sensor 1161-1, the input sensor 1161-2, or the digitizer 1161-3 is built into the display panel 1141. For example, at least one of fingerprint sensor 1161-1, the input sensor 1161-2, or the digitizer 1161-3 is simultaneously formed by a process that forms other elements, such as a light emitting element, a transistor, etc., of the display panel 1141.

In addition, the sensor module 1161 generates an electrical signal or a data value that corresponds to an internal state or an external state of the electronic device 1000. The sensor module 1161 further includes, for example, one or more of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 includes one or more antennas that transmit signals or power or receive signals or power. The antenna module 1162 includes the antenna ANT shown in FIG. 1. In an embodiment, the communication module 1173 transmits a signal to the external electronic device or receives a signal from the external electronic device through an antenna suitable for a communication scheme. An antenna pattern of the antenna module 1162 may be integrated into one component, such as the display panel 1141, of the display module 1140 or the input sensor 1161-2, etc.

The sound output module 1163 outputs a sound signal from the electronic device 1000, and includes, for example, a speaker for multimedia playback or transcription playback, etc., and a receiver used for call reception. The receiver may be integrally formed with the speaker or be formed separately from the speaker. A sound output pattern of the sound output module 1163 is integrated into the display module 1140.

The camera module 1171 can photograph still images and moving images. In an embodiment, the camera module 1171 includes one or more lenses, an image sensor, or an image signal processor. The camera module 1171 may further include an infrared camera that can detect a user's presence, a user's position, a user's eyes, etc.

The light module 1172 can provide light. The light module 1172 includes one of a light emitting diode or a xenon lamp. The light module 1172 may operate in connection with the camera module 1171 or operate independently from the camera module 1171.

The communication module 1173 establishes a wired or wireless communication channel between the electronic device 1000 and the external electronic device 2000, and supports communication through the established communication channel. The communication module includes one or more of a wireless communication module such as a cellular communication module, a short-range wireless communication module, or a global navigation satellite system (GNSS) communication module, and a wired communication module such as a local area network (LAN) communication module or a power line communication (PLC) module. The communication module 1173 communicates with the external electronic device 2000 through a short-range communication network such as Bluetooth™, a wireless-fidelity (WiFi) direct, or an infrared data association (IrDA), or a long-range communication network such as a cellular network, the Internet, or a computer network, such as a LAN or a wide area network (WAN)). The above-described types of communication modules may be implemented into one chip or be respectively implemented as separate chips.

The input module 1130, the sensor module 1161, the camera module 1171, etc., are used to control an operation of the display module 1140 in connection with the processor 1110.

The processor 1110 outputs commands or data to the display module 1140, the sound output module 1163, the camera module 1171, or the light module 1172, based on input data received from the input module 1130. For example, the processor 1110 generates image data that corresponds to input data received through at least one of a mouse or an active pen, etc., and outputs the image data to the display module 1140. Alternatively, the processor 1110 generates command data that corresponds to the input data, and outputs the command data to the camera module 1171 or the light module 1172. When no input data is received from the input module 1130 for a period of time, the processor 1110 may change the operation mode of the electronic device 1000 to a low power mode or a sleep mode, thereby reducing power consumed in the electronic device 1000.

The processor 1110 also outputs commands or data to the display module 1140, the sound output module 1163, the camera module 1171, or the light module 1172, based on sensing data received from the sensor module 1161. For example, the processor 1110 compares authentication data received from the fingerprint sensor 1161-1 with authentication data stored in the memory 1120, and then executes an application according to a comparison result. The processor 1110 executes a command or outputs corresponding image data to the display module 1140, based on sensing data sensed by the input sensor 1161-2 or the digitizer 1161-3. When a temperature sensor is included in the sensor module 1161, the processor 1110 receives temperature data from the sensor module 1161, and further performs luminance correction on the image data, based on the temperature data.

The processor 1110 receives measurement data of a user's presence, a user's position, a user's eyes, etc., from the camera module 1171. The processor 1110 further performs luminance correction on image data based on the measurement data. For example, the process 1110, which determines a user's presence through an input from the camera module 1171, outputs image data with corrected luminance to the display module 1140 through the data conversion circuit 1112-2 or the gamma correction circuit 1112-3.

At least some of the above-described components are connected to each other and exchange signals, such as commands or data, therebetween through an inter-peripheral communication scheme, such as a bus, a general purpose input/output (GPIO), a serial peripheral interface (SPI), a mobile industry processor interface (MIPI), or an ultra path interconnect (UPI) link. The processor 1110 communicates with the display module 1140 through an appointed interface, and uses any one of the above-described communication schemes. However, embodiments of the present disclosure are not necessarily limited to the above-described communication schemes.

The electronic device 1000 in accordance with various embodiments disclosed in the present disclosure may be one of various types of devices. The electronic device 1000 may be, for example, at least one of a portable communication device, such as a smartphone, a computer device, a portable multimedia device, a portable medical device, a camera, a wearable device, or a home appliance. However, the electronic device 1000 in accordance with embodiments of the present disclosure is not necessarily limited to the above-described devices.

In an input sensing device, a display device, and an electronic device in accordance with embodiments of the present disclosure, at least one gesture sensor electrode includes a bridge pattern that connects adjacent sub-electrodes separated from each other by the touch sensing lines. Thus, the gesture sensor electrodes are located in the sensing area inward from the touch sensing lines, and an area increase of the input sensing device, such as of the non-sensing area, can be minimized.

In addition, an antenna can be disposed in a concave part of at least one of the gesture sensor electrodes. Thus, an input sensing device, a display device, and an electronic device that are more compact and support communication can be provided.

Further, gesture sensing lines and communication lines are disposed or extend in a different direction from the touch sensing lines. Thus, the gesture sensing lines and the communication lines do not intersect the touch sensing lines, and interference caused by the touch sensing lines can be minimized.

Illustrative embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of embodiments of the present disclosure as set forth in the following claims.

What is claimed is:

1. An input sensing device, comprising:
    touch sensor electrodes disposed in a first sensing area of a base layer;
    gesture sensor electrodes disposed in a second sensing area of the base layer that surrounds the first sensing area, wherein the gesture sensor electrodes are electrically insulated from the touch sensor electrodes;
    first pads and second pads disposed in a non-sensing area of the base layer that is located at one side of the second sensing area;
    touch sensing lines that connect the touch sensor electrodes and the first pads to each other; and
    gesture sensing lines that connect the gesture sensor electrodes and the second pads to each other,
    wherein one of the gesture sensor electrodes includes:
        sub-electrodes separated from each other by the touch sensing electrodes; and
        a bridge that connects adjacent sub-electrodes to each other, and
    wherein the touch sensor electrodes have a mesh structure,
    wherein, in a plan view, each of the touch sensor electrodes connected to the touch sensing lines includes a protrusion part that protrudes between the sub-electrodes, and
    wherein, in a plan view, the bridge crosses the protrusion part.

2. The input sensing device of claim 1, wherein
    the touch sensor electrodes and the sub-electrodes are disposed in the same layer, and
    the bridge is disposed in a different layer from the touch sensor electrodes.

3. The input sensing device of claim 1,
    wherein the touch sensing lines do not have a mesh structure, and
    wherein the bridge does not cross the touch sensing lines.

4. The input sensing device of claim 1, wherein another of the gesture sensor electrodes includes only one electrode, and does not include any sub-electrodes.

5. The input sensing device of claim 1, wherein, in a plan view, the sub-electrodes are spaced apart from the touch sensor electrodes by 100 µm or more.

6. The input sensing device of claim 1, further comprising:
    a touch driver connected to the first pads, wherein the touch driver senses an object's touch input; and
    a gesture driver connected to the second pads, wherein the gesture driver senses an object's approach or motion.

7. The input sensing device of claim 1, wherein the gesture sensor electrodes include four gesture sensor electrodes that extend along an edge of the first sensing area in different directions with respect to the first sensing area.

8. The input sensing device of claim 1, wherein, in a plan view,
    the touch sensing lines extend along a first side of the base layer, and the gesture sensing lines extend along a second side of the base layer that differs from the first side, and
    wherein the touch sensing lines and the gesture sensing lines do not intersect each other.

9. The input sensing device of claim 1, further comprising an antenna,
    wherein at least one gesture sensor electrode includes a concave part that has a width that is less than an average width of the gesture sensor electrodes, and
    wherein the antenna has a shape that corresponds to a shape of the concave part and is disposed in the concave part.

10. The input sensing device of claim 9, wherein, in a plan view, the antenna is spaced apart from the at least one gesture sensor electrode by 100 µm or more.

11. The input sensing device of claim 10, wherein the average width of the gesture sensor electrodes is about 500 µm, and the width of the antenna is about 300 µm.

12. The input sensing device of claim 9, further comprising:
- a third pad disposed in the non-sensing area of the base layer; and
- a communication line that connects the third pad and the antenna to each other,
- wherein the antenna includes a first electrode and a second electrode that surrounds the first electrode, and
- wherein the communication line includes a pair of ground lines connected to the second electrode and a signal line between the pair of ground lines and that is connected to the first electrode.

13. The input sensing device of claim 1, wherein, in a plan view, the bridge crosses one of the touch sensing lines.

14. A display device, comprising:
- a display layer that includes light emitting elements; and
- a sensor layer disposed on the display layer,
- wherein the sensor layer includes:
  - touch sensor electrodes disposed in a first sensing area;
  - touch sensing lines connected to the touch sensor electrodes;
  - gesture sensor electrodes disposed in a second sensing area that surrounds the first sensing area, wherein the gesture sensor electrodes are electrically insulated from the touch sensor electrodes; and
  - gesture sensing lines connected to the gesture sensor electrodes,
- wherein one of the gesture sensor electrodes includes:
  - sub-electrodes that are separated from each other by the touch sensing lines; and
  - a bridge that connects adjacent sub-electrodes to each other, and
- wherein the touch sensor electrodes have a mesh structure,
- wherein, in a plan view, each of the touch sensor electrodes connected to the touch sensing lines includes a protrusion part that protrudes between the sub-electrodes, and
- wherein, in a plan view, the bridge crosses the protrusion part.

15. The display device of claim 14, wherein, in a plan view, the sub-electrodes are spaced apart from the touch sensor electrodes by 100 μm or more.

16. The display device of claim 14,
- wherein, in a plan view, the touch sensing lines extend along a first side of the base layer, and the gesture sensing lines extend along a second side of the base layer that differs from the first side, and
- wherein the touch sensing lines and the gesture sensing lines do not intersect each other.

17. The display device of claim 14, wherein the sensor layer further includes an antenna,
- wherein at least one of the gesture sensor electrodes includes a concave part that has a width that is less than an average width of the gesture sensor electrodes, and
- the antenna has a shape that corresponds to a shape of the concave part and is disposed in the concave part.

18. An electronic device, comprising:
- a display panel that includes light emitting elements;
- a sensor disposed on the display panel; and
- a processor connected to the display panel and the sensor,
- wherein the sensor includes:
  - touch sensor electrodes disposed in a first sensing area;
  - gesture sensor electrodes disposed in a second sensing area that surrounds the first sensing area, wherein the gesture sensor electrodes are electrically insulated from the touch sensor electrodes and at least one of the gesture sensor electrodes includes a concave part that has a width that is less than an average width of the gesture sensor electrode; and
  - an antenna that has a shape that corresponds to a shape of the concave part and is disposed in the concave part, and
- wherein the processor
  - senses an object's touch input based on a sensing signal received from the touch sensor electrodes,
  - senses an object's approach or motion based on a sensing signal received from the gesture sensor electrodes, and
  - communicates with an external device through the antenna.

* * * * *